Jan. 31, 1961  R. G. NYE ET AL  2,969,599
GROUP TRAINER FOR OPERATORS OF ECHO-RANGING EQUIPMENT
Filed May 9, 1946  26 Sheets-Sheet 1
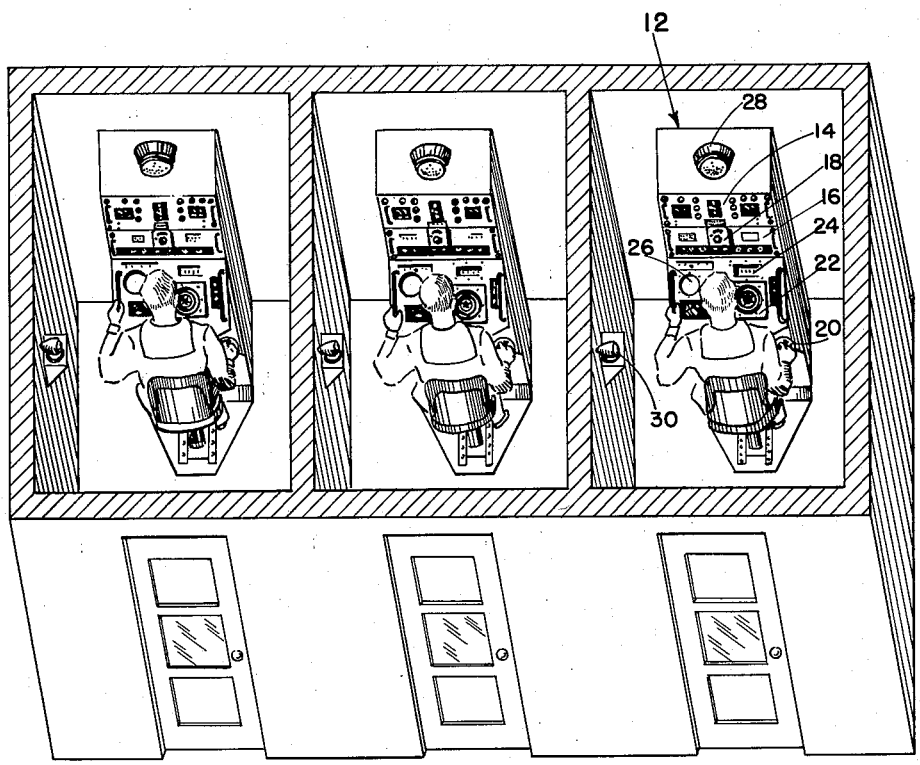
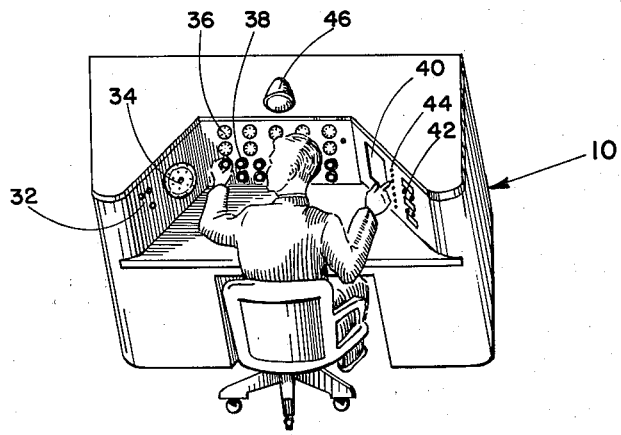
FIG. 1
Inventors
ROBERT GLEN NYE
GEORGE A. BRETTELL, JR.
LAUREL T. APPLE
By
Attorney

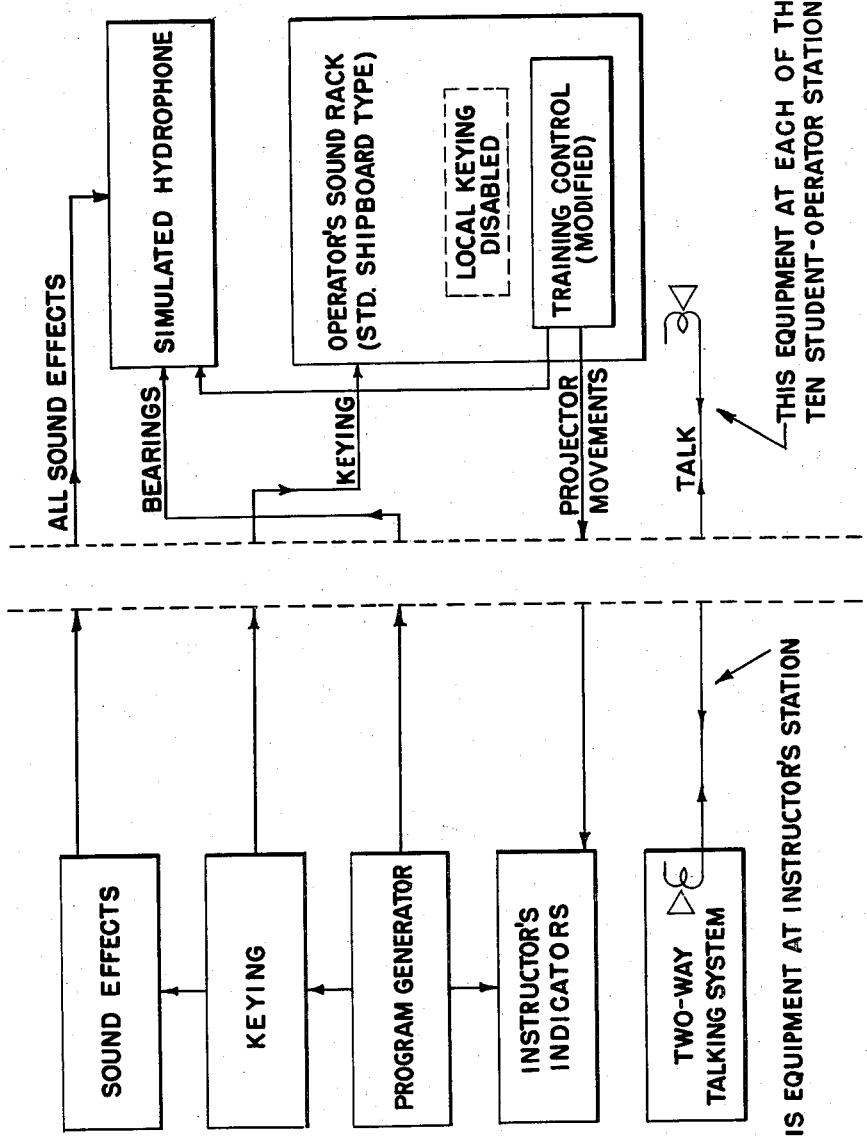

Jan. 31, 1961 R. G. NYE ET AL 2,969,599
GROUP TRAINER FOR OPERATORS OF ECHO-RANGING EQUIPMENT
Filed May 9, 1946 26 Sheets-Sheet 3
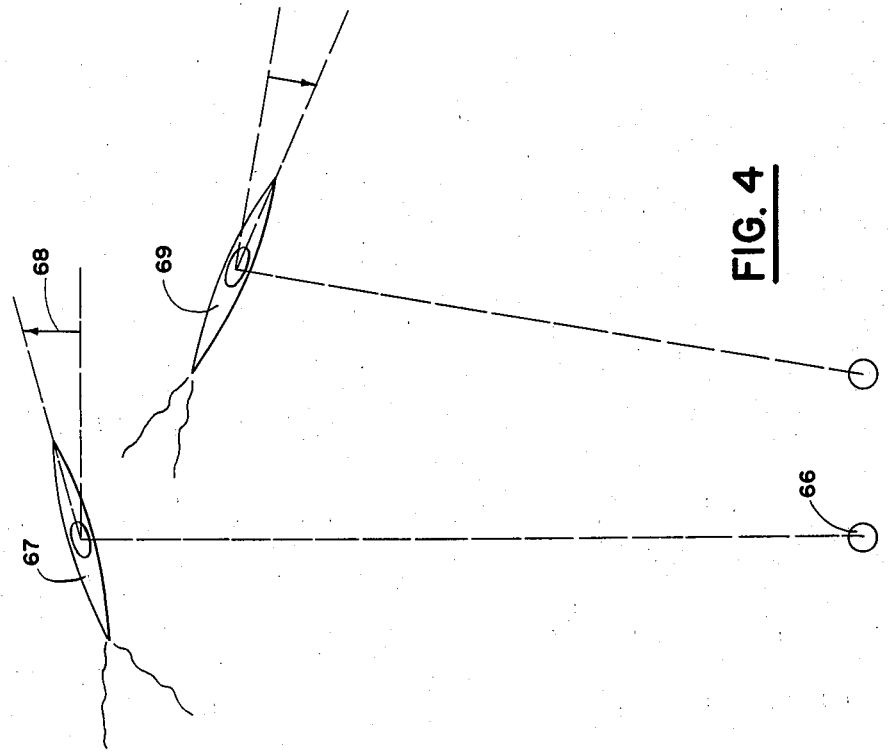
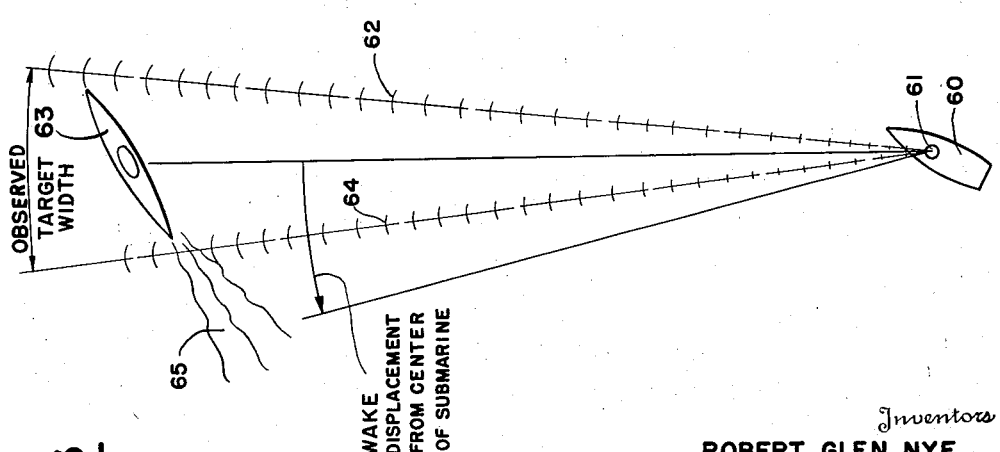
Inventors
ROBERT GLEN NYE
GEORGE A. BRETTELL, JR.
LAUREL T. APPLE
By M. Hayes
Attorney

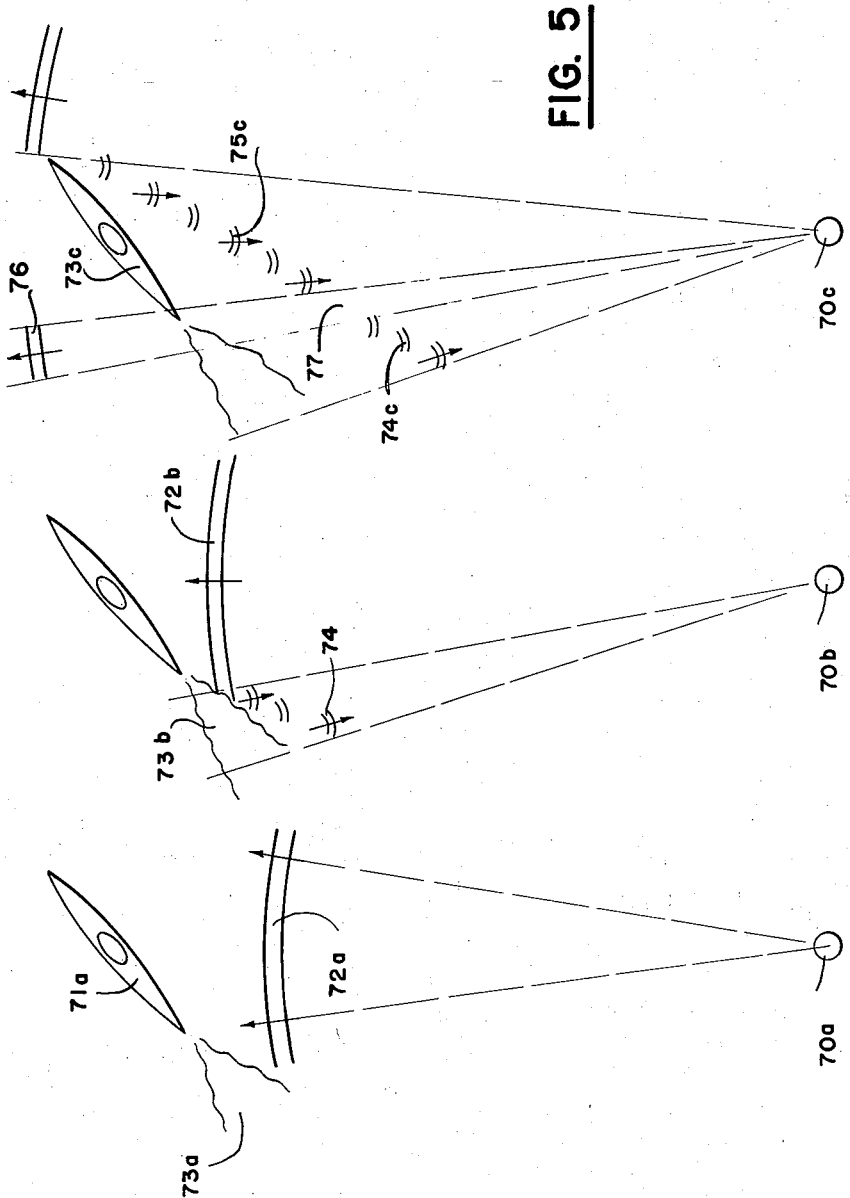

Jan. 31, 1961 R. G. NYE ET AL 2,969,599
GROUP TRAINER FOR OPERATORS OF ECHO-RANGING EQUIPMENT
Filed May 9, 1946 26 Sheets-Sheet 5
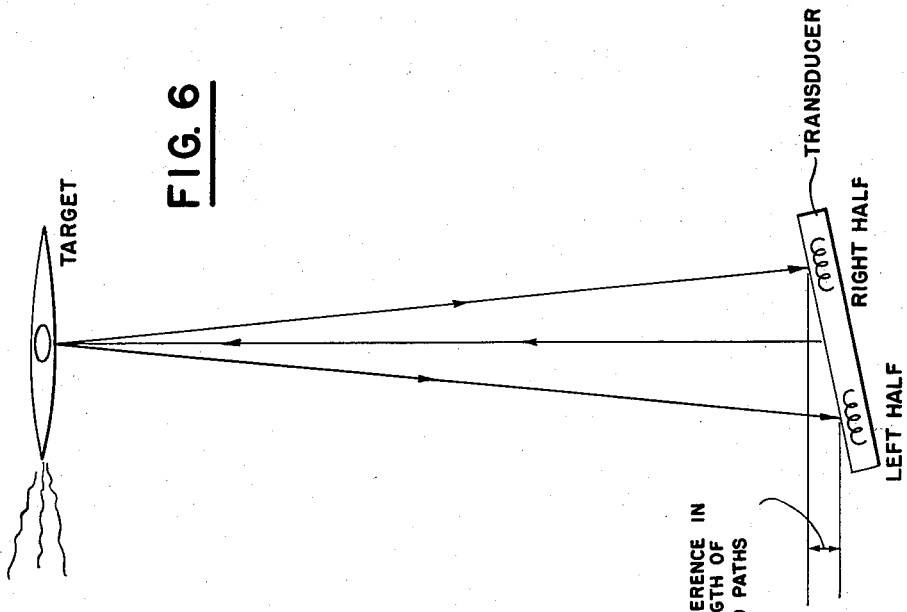
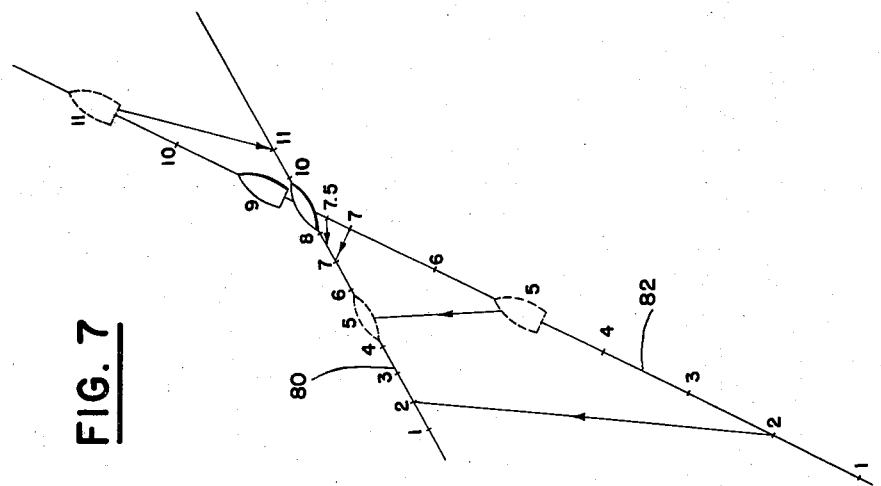
Inventors
ROBERT GLEN NYE
GEORGE A. BRETTELL, JR.
LAUREL T. APPLE
By M. O. Hayes
Attorney

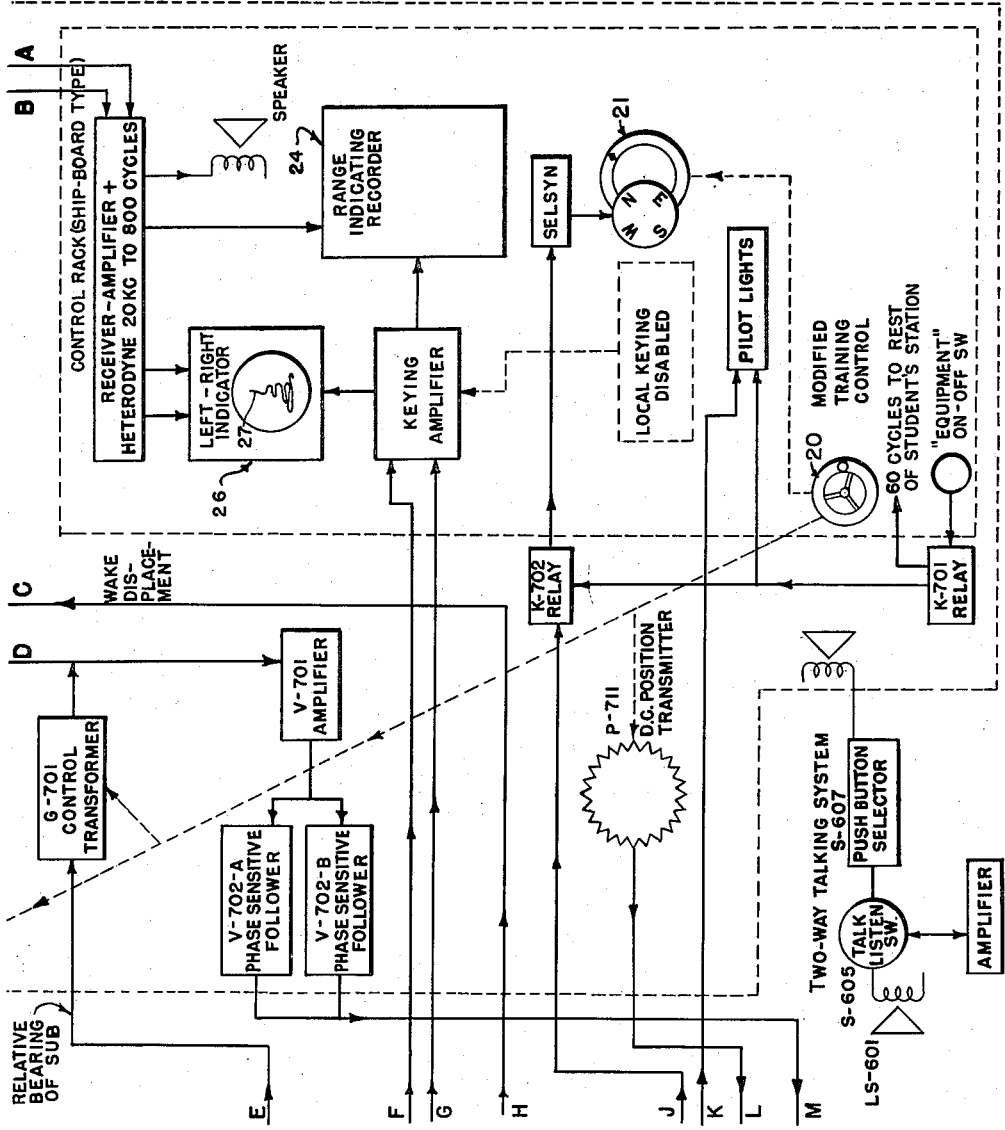

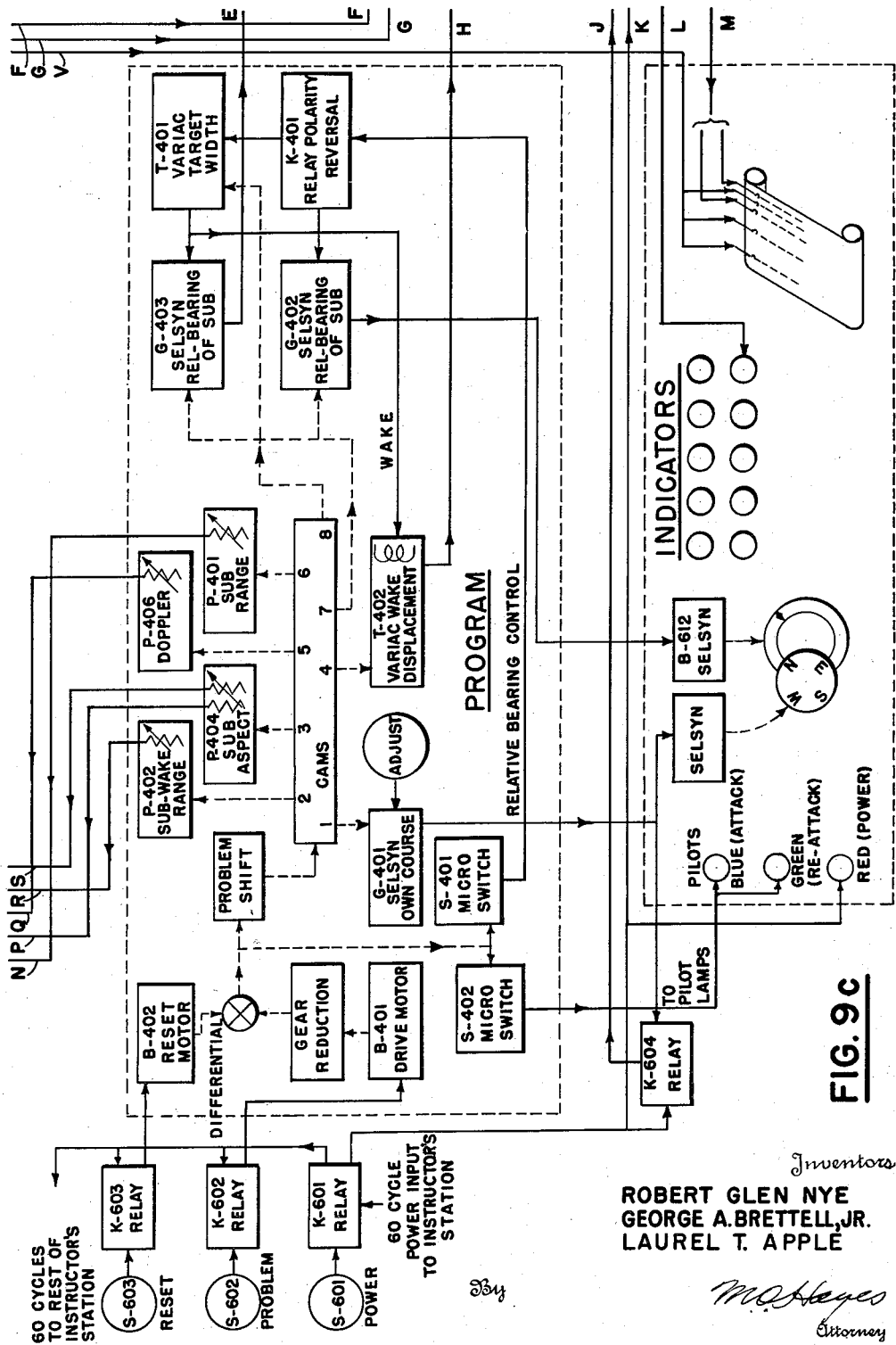

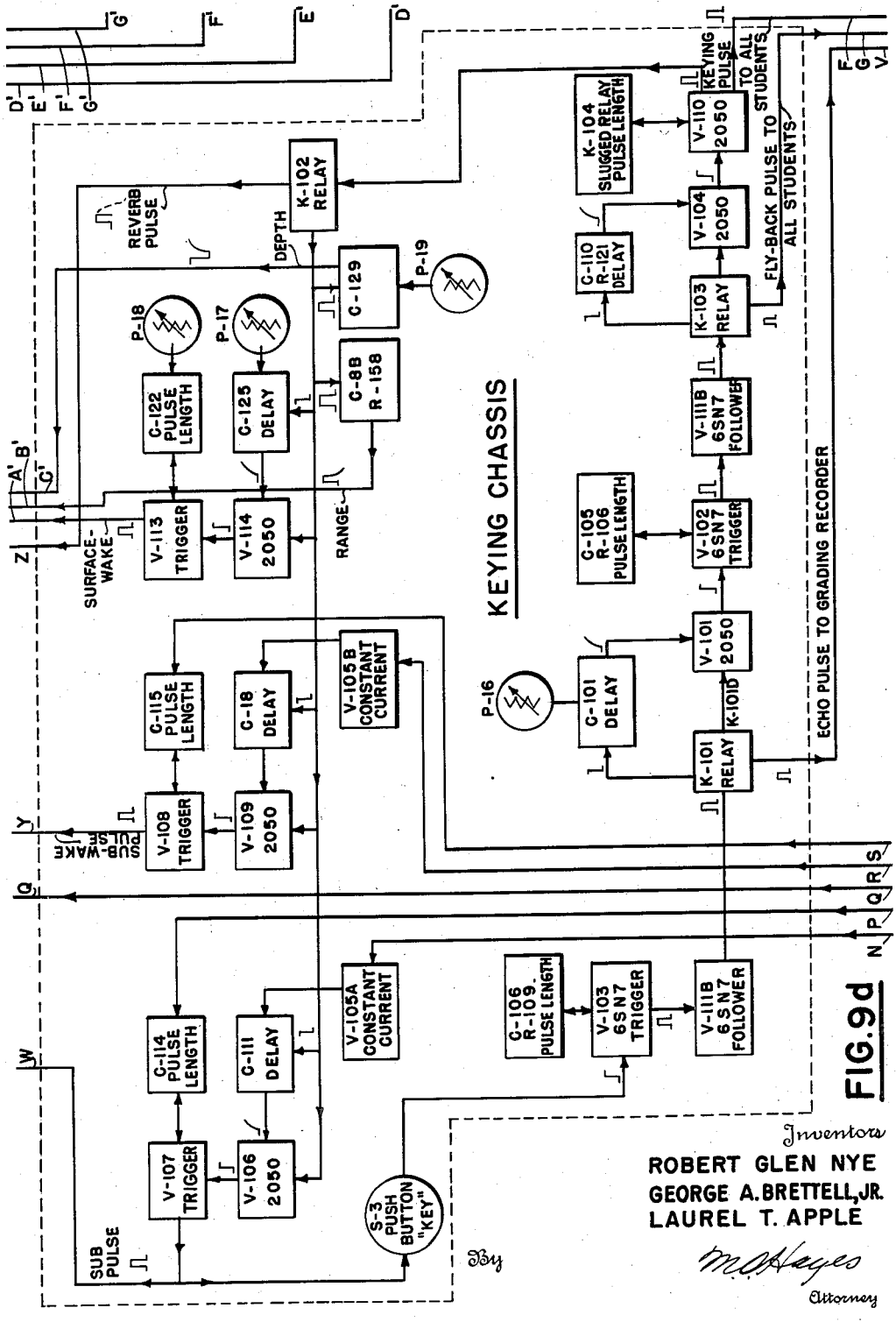

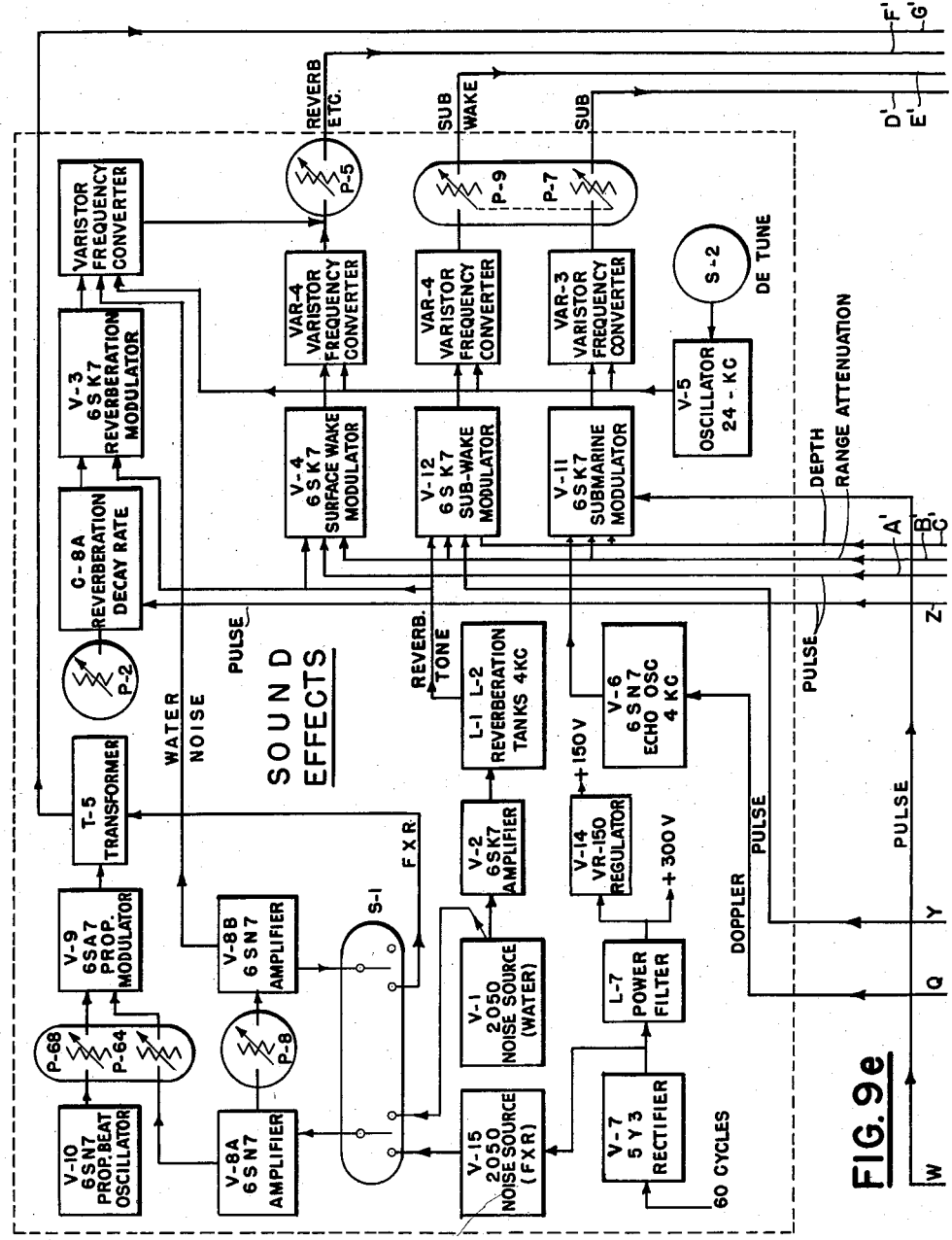

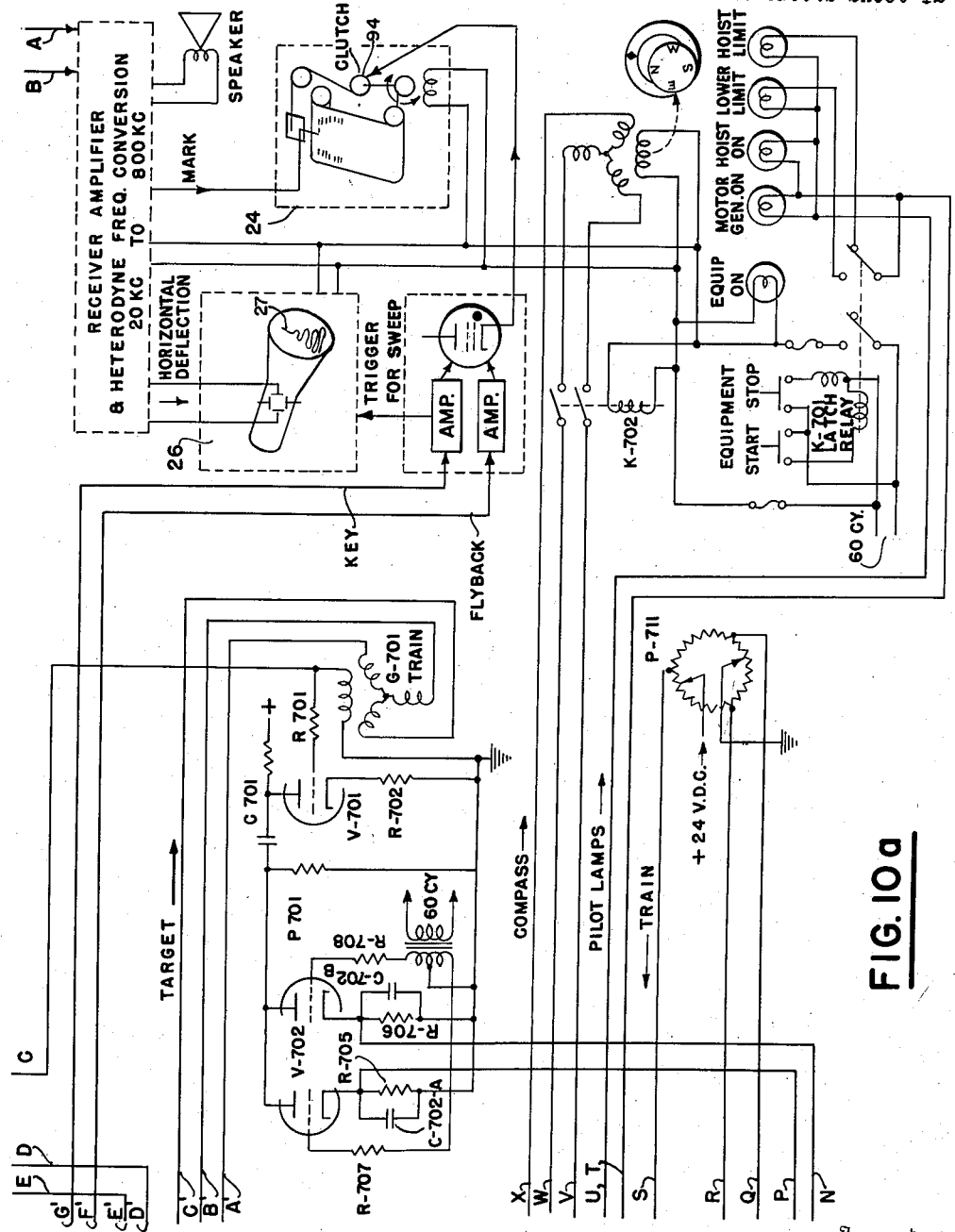

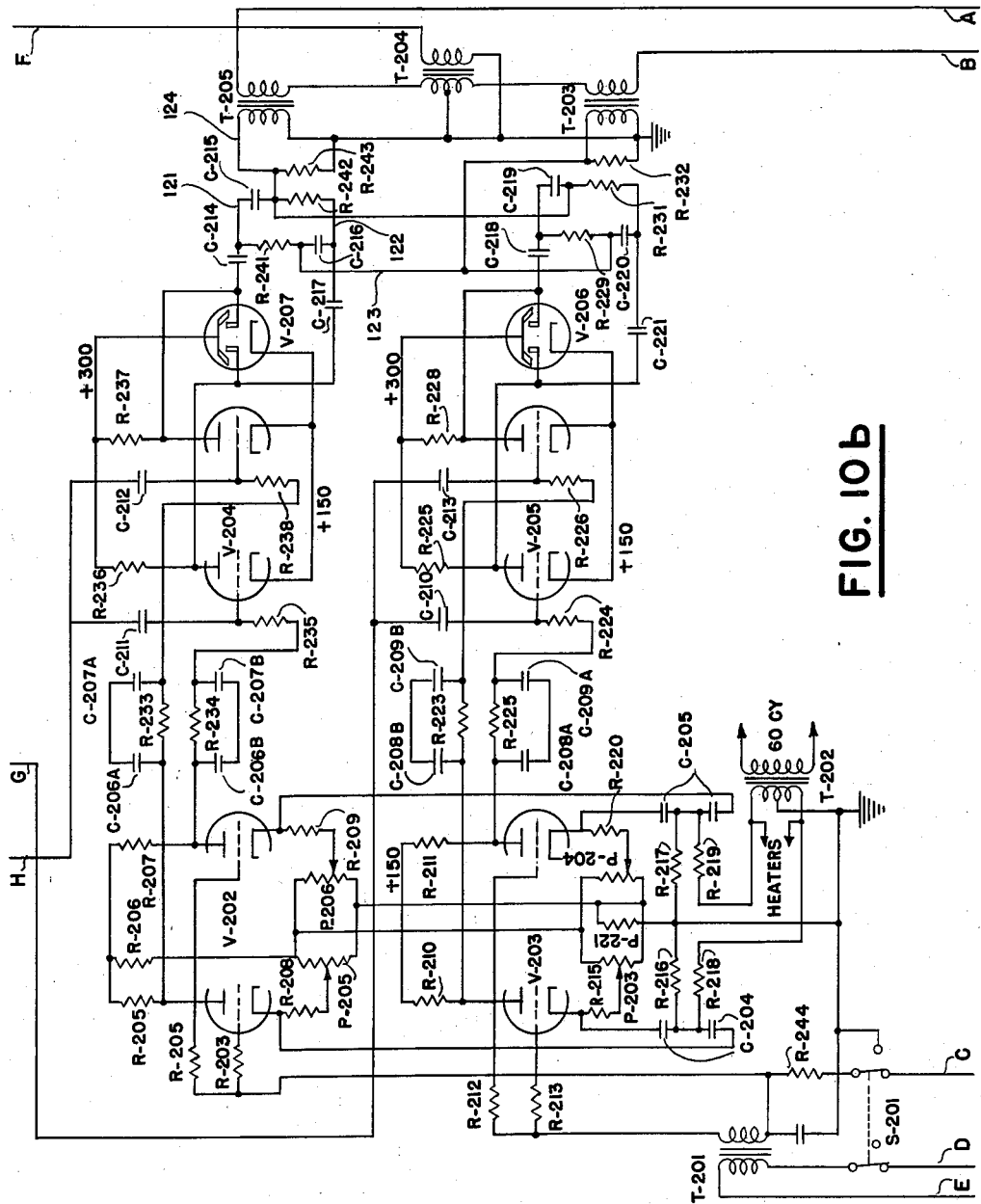

Jan. 31, 1961 R. G. NYE ET AL 2,969,599
GROUP TRAINER FOR OPERATORS OF ECHO-RANGING EQUIPMENT
Filed May 9, 1946 26 Sheets-Sheet 14

Inventors
ROBERT GLEN NYE
GEORGE A. BRETTELL, JR.
LAUREL T. APPLE
By M. O. Hayes
Attorney

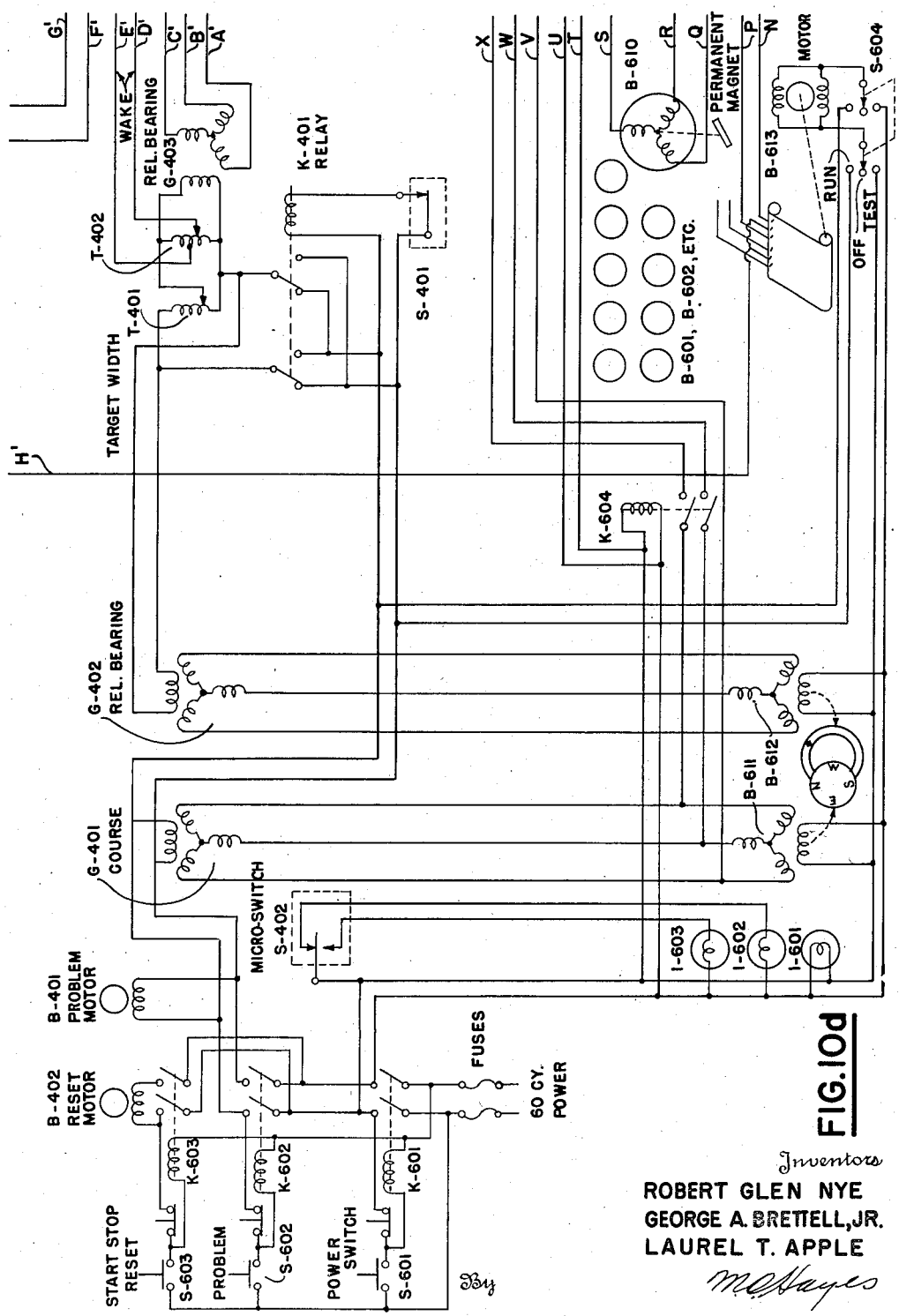

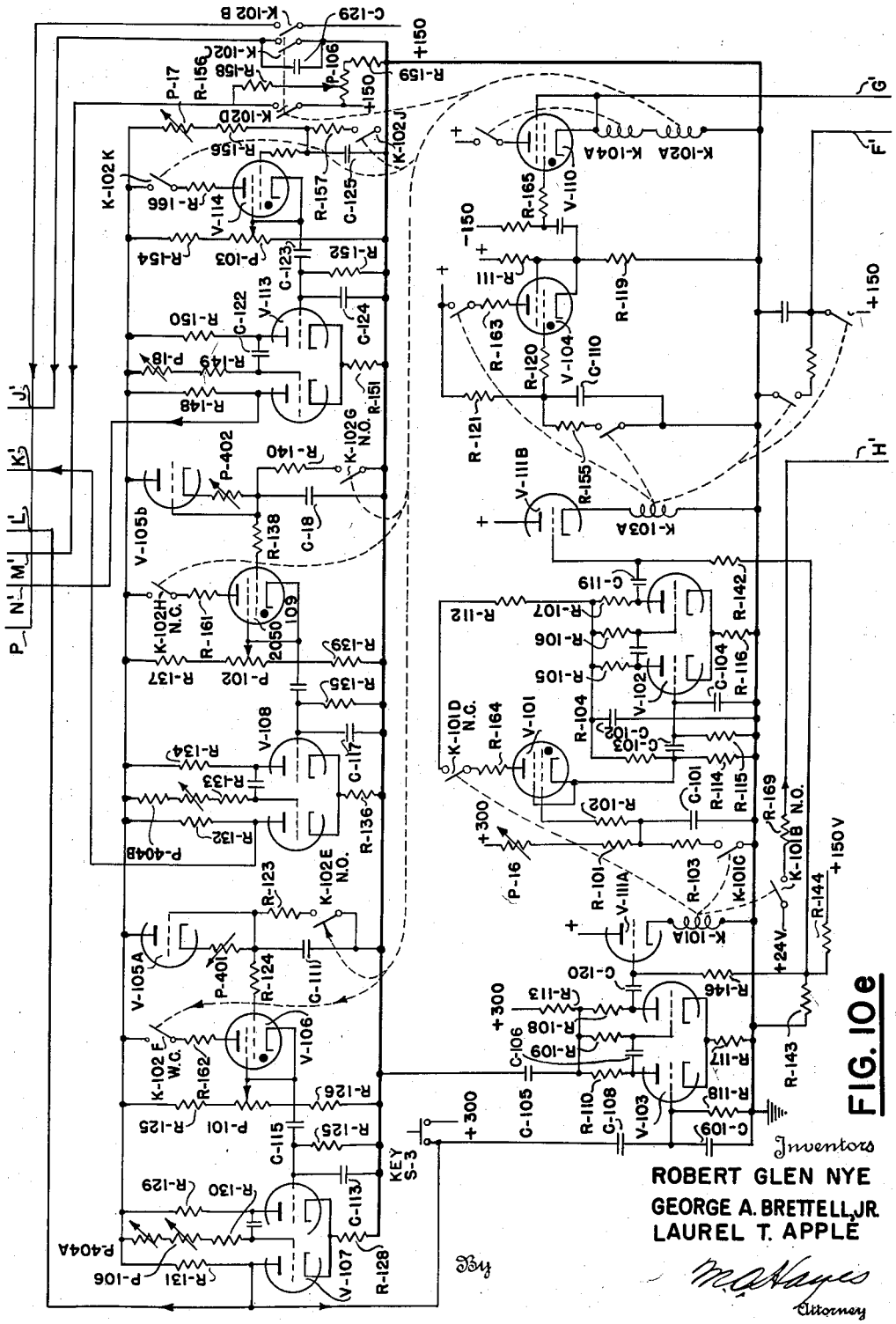

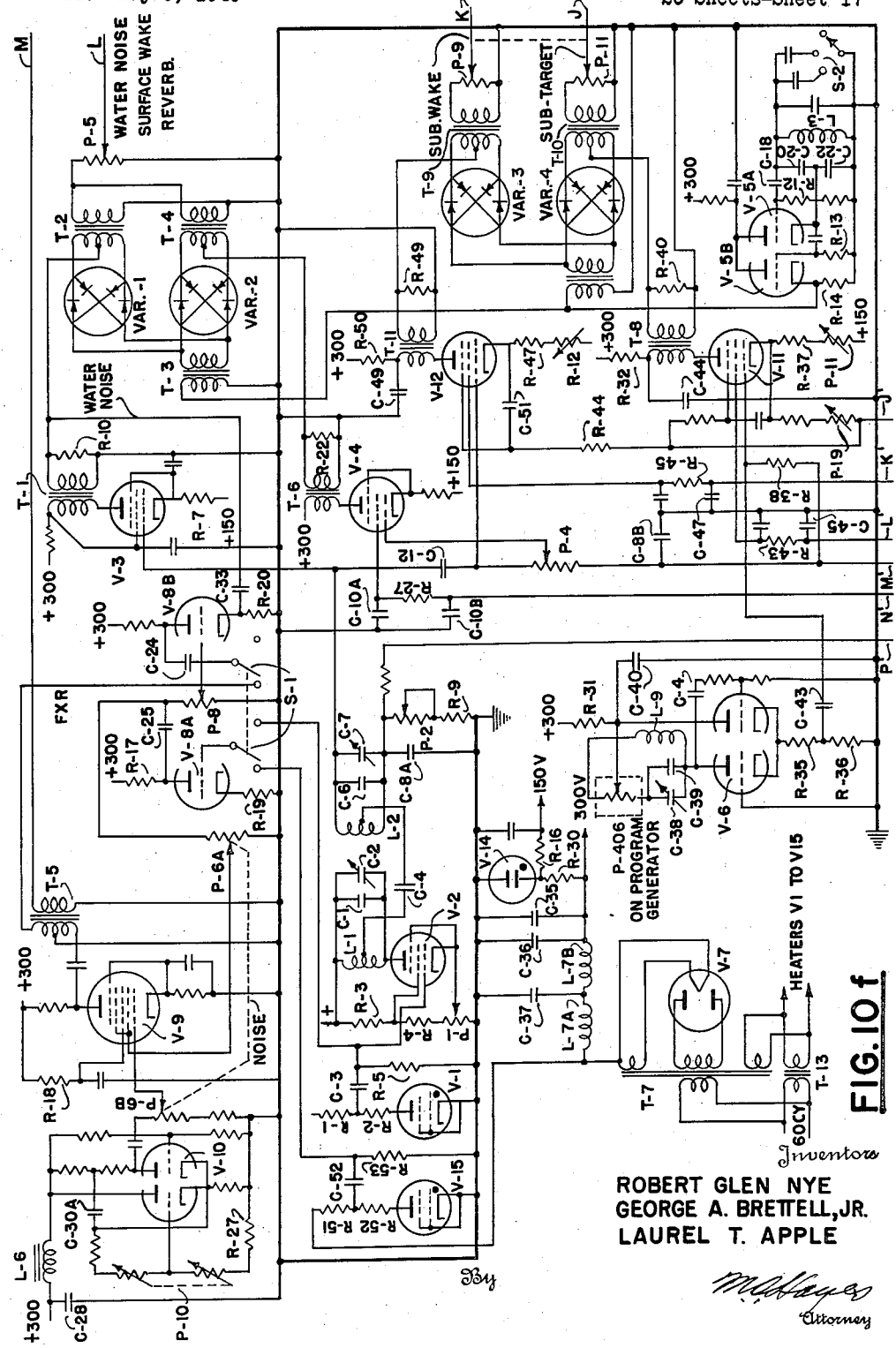

Jan. 31, 1961 R. G. NYE ET AL 2,969,599
GROUP TRAINER FOR OPERATORS OF ECHO-RANGING EQUIPMENT
Filed May 9, 1946 26 Sheets-Sheet 18
FIG. 10 g
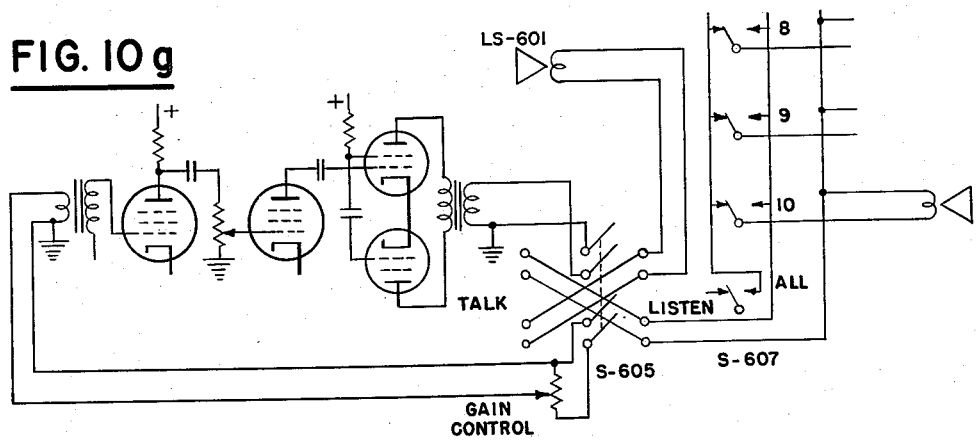
COMMUNICATION CIRCUIT
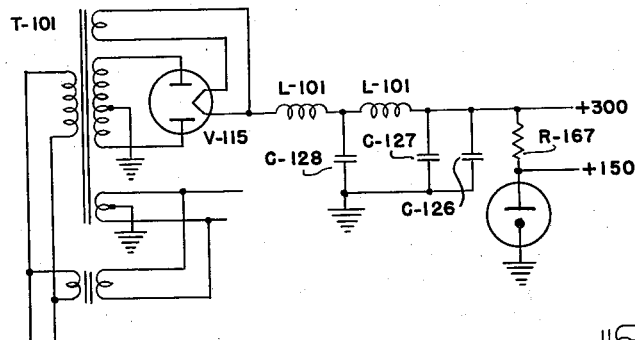
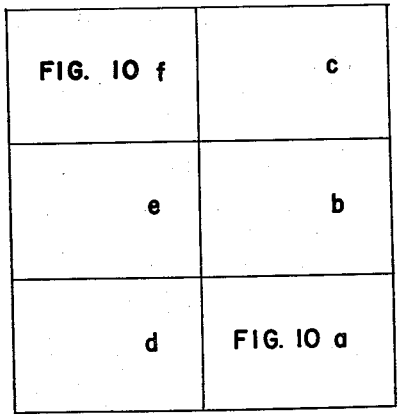
ARRANGEMENT OF SHEETS
COMPRISING FIG. 10
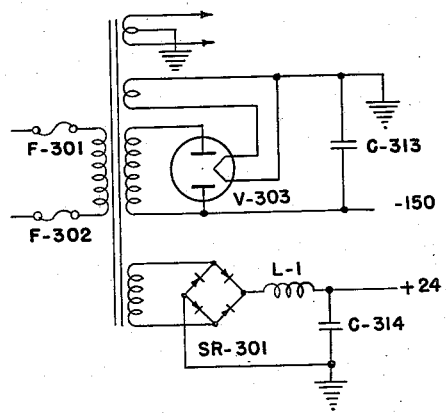
Inventors
ROBERT GLEN NYE
GEORGE A. BRETTELL, JR.
LAUREL T. APPLE
By
M. Q. Hayes
Attorney Jan. 31, 1961  R. G. NYE ET AL  2,969,599
GROUP TRAINER FOR OPERATORS OF ECHO-RANGING EQUIPMENT
Filed May 9, 1946  26 Sheets-Sheet 20

* THESE THREE TIME DELAYS FOR
THE THREE ECHOES START TOGETHER
BUT END INDEPENDENTLY.

Inventors
ROBERT GLEN NYE
GEORGE A. BRETTELL, JR.
LAUREL T. APPLE

By M. O. Hayes
Attorney

Jan. 31, 1961 R. G. NYE ET AL 2,969,599
GROUP TRAINER FOR OPERATORS OF ECHO-RANGING EQUIPMENT
Filed May 9, 1946 26 Sheets-Sheet 21
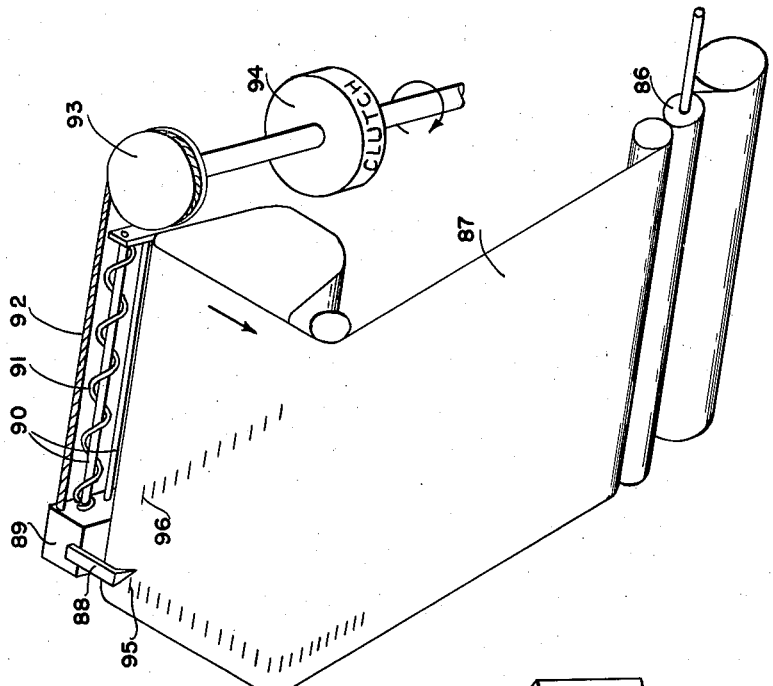
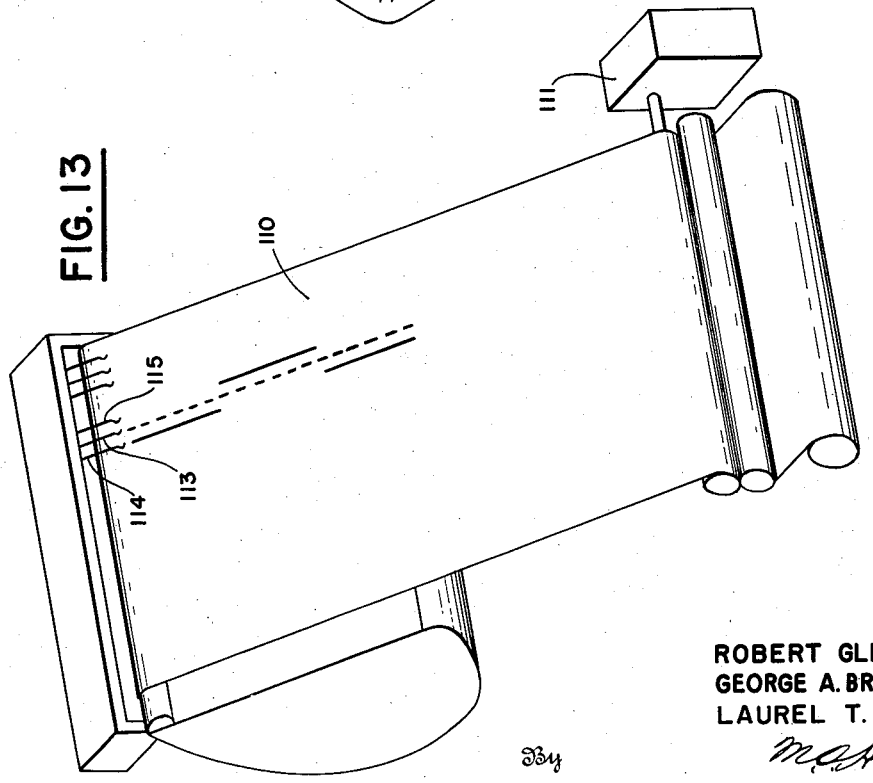
Inventors
ROBERT GLEN NYE
GEORGE A. BRETTELL, JR.
LAUREL T. APPLE
By M. A. Hayes
Attorney Jan. 31, 1961   R. G. NYE ET AL   2,969,599
GROUP TRAINER FOR OPERATORS OF ECHO-RANGING EQUIPMENT
Filed May 9, 1946   26 Sheets-Sheet 22

INVENTORS
ROBERT GLEN NYE
GEORGE A. BRETTELL, JR.
LAUREL T. APPLE
BY
*M. C. Hayes*
Attorney Jan. 31, 1961  R. G. NYE ET AL  2,969,599
GROUP TRAINER FOR OPERATORS OF ECHO-RANGING EQUIPMENT
Filed May 9, 1946  26 Sheets-Sheet 23

Inventors
ROBERT GLEN NYE
GEORGE A. BRETTELL, JR.
LAUREL T. APPLE
By
M. O. Hayes
Attorney Jan. 31, 1961   R. G. NYE ET AL   2,969,599
GROUP TRAINER FOR OPERATORS OF ECHO-RANGING EQUIPMENT
Filed May 9, 1946   26 Sheets-Sheet 26

Inventors
ROBERT GLEN NYE
GEORGE A. BRETTELL, JR.
LAUREL T. APPLE

By  M. A. Hayes
Attorney

United States Patent Office 2,969,599
Patented Jan. 31, 1961

2,969,599

GROUP TRAINER FOR OPERATORS OF ECHO-RANGING EQUIPMENT

Robert Glen Nye, George A. Brettell, Jr., and Laurel T. Apple, San Diego, Calif., assignors to the United States of America as represented by the Secretary of the Navy Filed May 9, 1946, Ser. No. 668,450

1 Claim. (Cl. 35—10.4)

The present invention relates to training apparatus and particularly to a system for giving instruction and practice simultaneously to a group of students in the operation of underwater echo-ranging equipment.

Echo-ranging is employed by war ships for locating submarines and for guiding depth charge attacks. The echo-ranging apparatus transmits a ping, or short pulse of sound, into the water and receives back echoes from the target submarine. The hydrophone, or electro-mechanical transducer, from which the sounds emanate, is directional so the sound is sent out into the water as though in a narrow beam. The same hydrophone picks up the echo if it returns along this same beam. Obviously an echo returns only if some underwater object capable of reflecting the sound intercepts the beam within the range of the apparatus. According to one method of operating, the operator sets the equipment to transmit a short pulse of sound or "ping" once each 3.75 seconds and rotates the transducer 5 degrees in azimuth after each ping while he continually listens for echoes. Each "ping" consists of a single frequency and lasts perhaps .05 second. When an echo is received, the direction in which the transducer is pointing tells the operator the bearing of the target, and the time interval between the transmission and the return is a measure of the range of the target, that is, its distance from the searching ship. Sound in sea water requires approximately 1.25 seconds to travel out 1000 yards and back to the transducer.

Generally, echo-ranging operations are carried on at supersonic frequencies, for example 20 kc. per second, because the hydrophone shows sharper directional discrimination at high frequencies than at low. Heterodyne circuits make these supersonic tones audible to the operator, as for example at 800 cycles per second. The sounds in the sea water exhibit doppler effect, that is they exhibit frequency shifts that result both from the motions of the transmitting ship and the reflecting objects.

In addition to echoes the operator hears so-called reverberations following each transmission. These consist of random reflections of sound from nearby objects such as the hull of his own ship and the rippled surface of the water. The reverberation sound consists of a loud, jumbled noise that diminishes in intensity with time over a period of a few seconds.

The propellers of the operator's own ship generate a noise which is especially audible whenever his transducer is faced aft. The movement of his own ship through the water and also the movement of his transducer, which projects out of the ship's hull into the water, produce a rushing noise. Wakes, which consist of turbulent water left by ships, will reflect sound and thereby produce echoes. A surface ship may tow a noise-making device astern for diverting or confusing attacks against it. The noises generated by such a device are also audible on the echo-ranging equipment.

The operator of such equipment must learn both to operate his equipment according to standard procedures and to recognize all these various sounds so as to distinguish genuine target echoes from them. Since it is expensive and impractical to take several ships to sea for giving instruction to a small group of sound men it is desirable that training and practice equipment be provided for simulating the shipboard operation of sound gear.

The attack by a surface ship on a submarine, once its echo is picked up on the sound gear, may consist of an attempt to run across the course of the submarine and drop depth charges sufficiently far ahead of the submarine that those charges will descend to the depth of the submarine, meet the submarine there and explode close to it. In this attack, as the attacking ship nears the submarine, the sound man loses contact because the submarine is in general considerably below the surface and the beam of sound does not project down at a sharp enough angle to maintain sound contact when the submarine is closer than approximately three times its depth. Under these conditions the sound man is required to follow a so-called "lost contact procedure" for conducting his search in the direction from his ship in which the submarine is most likely to reappear from the dead zone under the attacking ship.

It is an object of the present invention to provide practice equipment for simulating these operating situations.

It is a further object to provide a system by which a single instructor can direct and monitor a large number of students who are practicing separately.

It is a further object to employ as the student's stations regular equipment of the shipboard type to thereby improve the realism and the effectiveness of the practice.

It is a further object to provide apparatus which takes the students through a performance that simulates the echo-ranging operations during an attack by a surface ship on a submarine.

It is a further object to provide new and improved electrical and mechanical apparatus for simulating the various underwater sound effects, and for supplying synthetic but realistic signals to standard underwater receiving equipment.

These and other objects and advantages of the invention will appear from the following description of one specific embodiment. In the drawings:

Fig. 1 is a pictorial view of an installation of the present invention showing the manner in which it is used.

Fig. 2 is a simplified block diagram showing the general organization of the elements of the equipment and their relations to each other.

Figs. 3, 4, 5 and 6 are charts for the purpose of explaining certain characteristics of underwater sound equipment which are simulated in the present invention.

Fig. 7 is a chart for explaining certain aspects of echo-ranging operations during an attack on a submarine.

Fig. 9, comprising portions 9a to 9e, is a complete functional block diagram showing the instructor's equipment and the problem equipment and showing also one student's station.

Fig. 10, comprising portions 10a to 10g, is an electrical schematic diagram of the equipment.

Figure 11A:
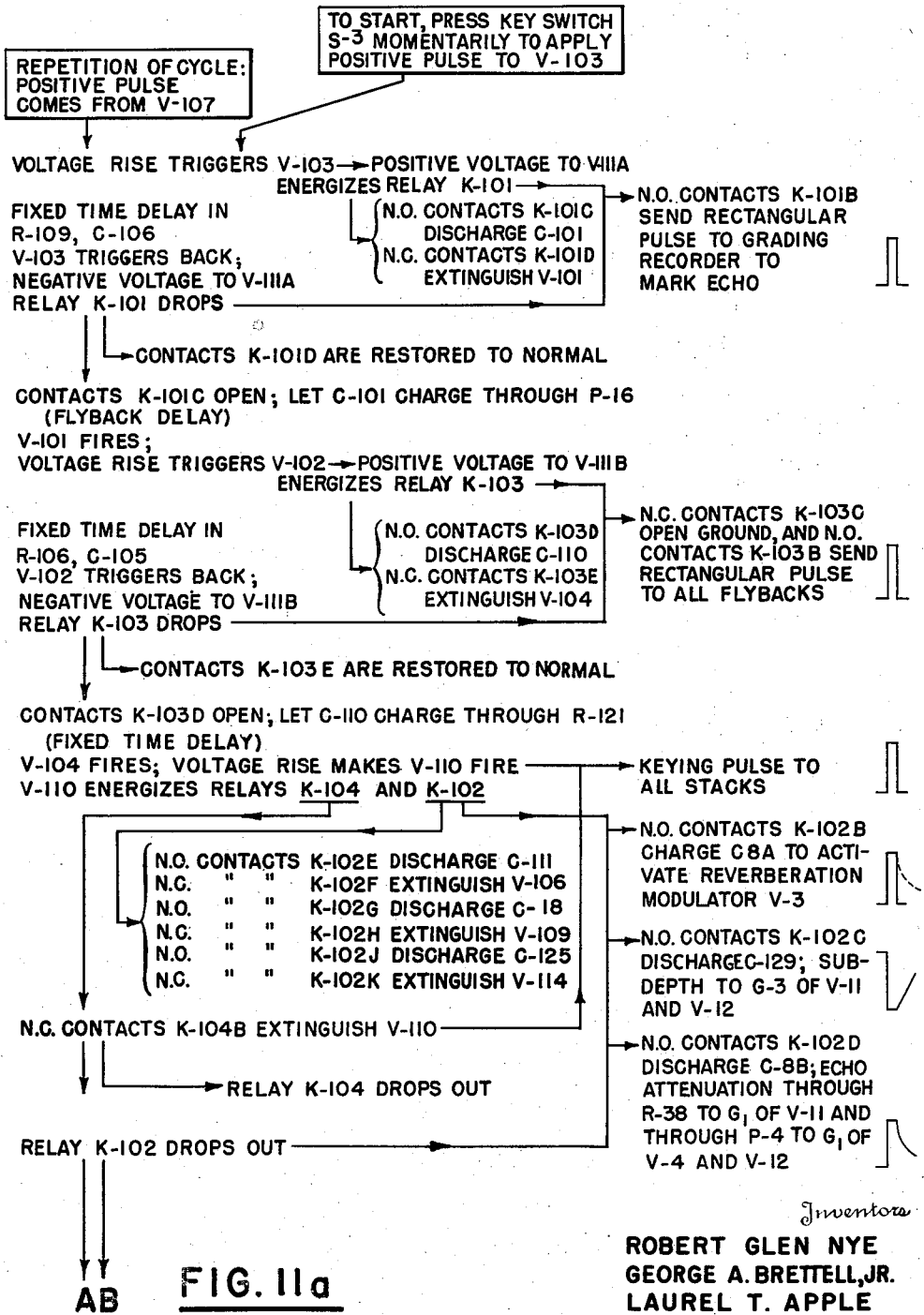
Figure 11B:
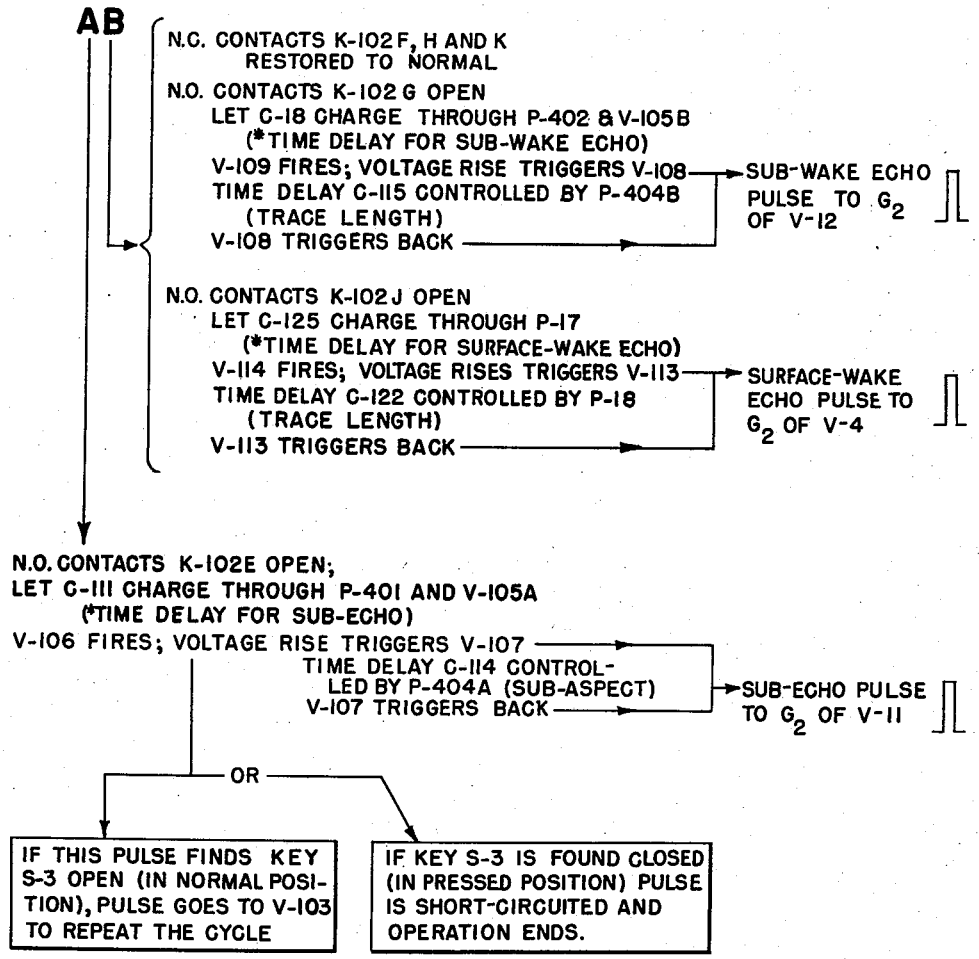

Fig. 11, comprising portions 11a and 11b, is a chart outlining the sequence of operations of the timing circuits of the so-called "keying chassis."

Fig. 12 is a pictorial view of an "indicating range recorder" that constitutes part of the student-operator's station.

Fig. 13 is a pictorial view of a recorder included in the instructor's station.

Figure 14:
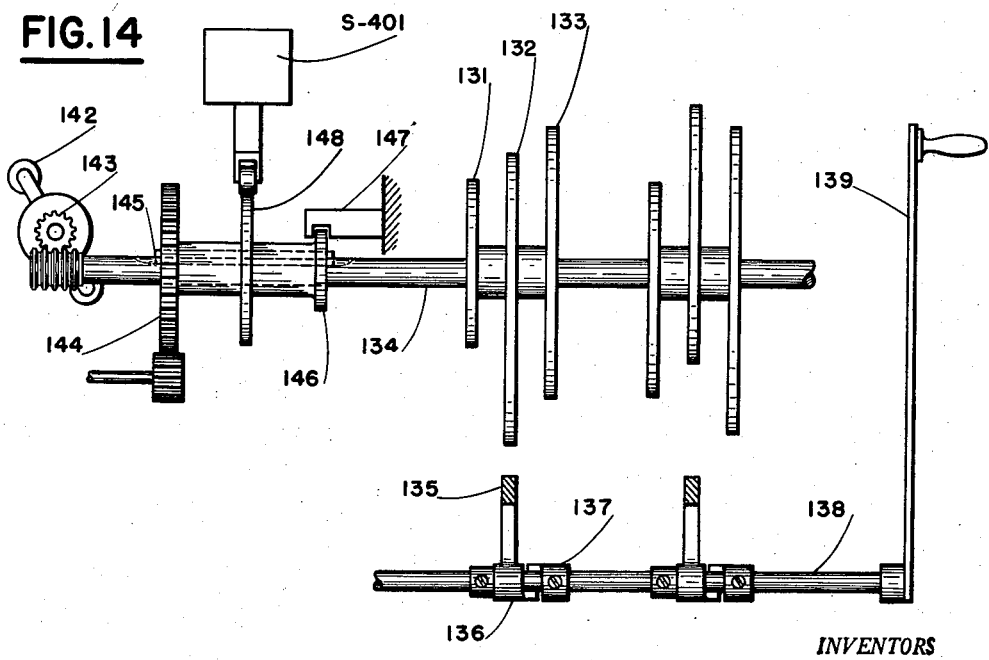

Fig. 14 is an elevational view of part of the cam mechanism.

Figure 15:
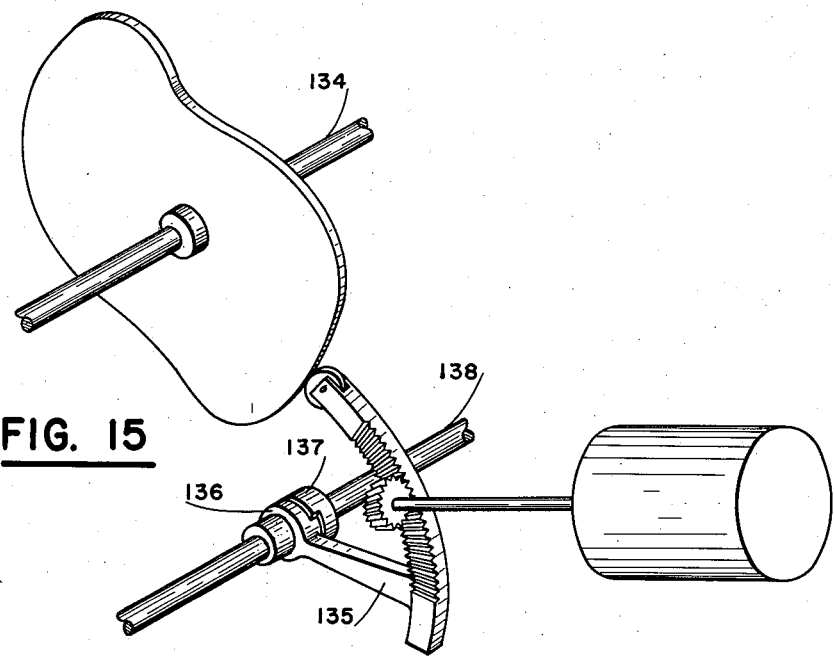

Fig. 15 is a pictorial view of a cam and follower.

Figs. 16 to 21 are diagrams for explaining the operation of the present system.

Figure 8:
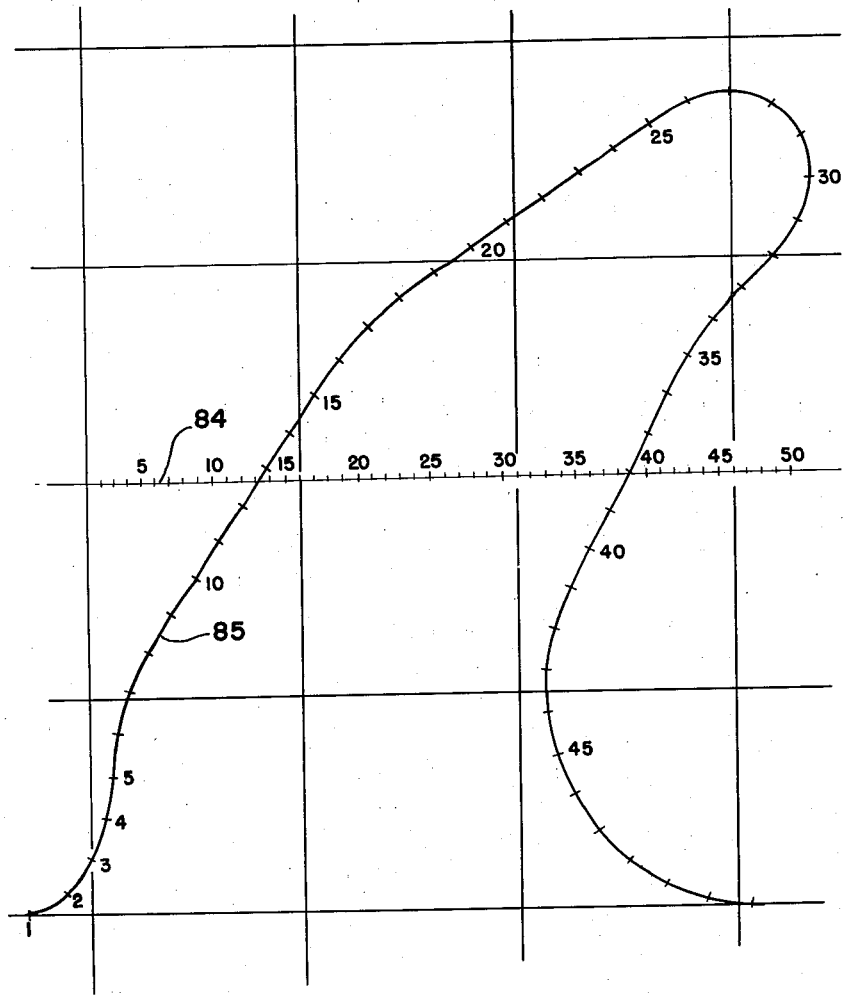
Fig. 8 is a chart showing the tracks of the submarine and the surface ship for one of the attack problems that are included in the apparatus of the present invention.

Figs. 22 to 29 are graphs of the actions that the cams generate for the attack problem of Fig. 8.

In Fig. 1 is shown a part of an installation of the present invention including an instructor's station 10 and three students' stations 12. Each student's station is housed in a separate sound-insulated booth and consists principally of a regular shipboard type of operator's control station or sound rack. It includes a power control panel 14 which contains various push buttons and pilot lights, a receiver amplifier 16 which includes a tuning control 18, a hand wheel 20 for turning the hydrophone around, a course and bearing indicator 22, a so-called "indicating range recorder" 24, a bearing-deviation indicator 26, and a loud-speaker 28. A speaker 30 provides voice communication between the student and the instructor.

The instructor's station 10 includes pilot lights 32, a bearing and course indicator 34, ten bearing repeaters 36, 12 manual controls 38 for the sound effects, a grading recorder 40, push button controls 42, and voice-communication controls 44 and speaker 46.

Under control of the instructor, the apparatus contained in the station 10 generates synthetic pings, reverberations, echoes, and the like, all typical of an attack by a surface ship on a submarine. These signals are transmitted to all the students but the audibility of the echoes, and certain other responses of the apparatus, are made to depend on the students' actions in simulation of actual sea operations.

Fig. 2 is a simplified block diagram indicating the principal components of the apparatus and their organization. As shown in the left portion of Fig. 2 the equipment at the instructor's station includes a sound-effects chassis for generating echo and reverberation tones etc., a keying chassis for controlling the durations and intervals of the various sounds, a program generator for, among other things, varying the intervals and other characteristics of the various sounds, a group of indicators for informing the instructor of the progress of the problem and the performances of the student, and the controls for the two-way talking system. The student's station, in addition to the modified shipboard type of sound rack, includes a simulated hydrophone which controls the echoes and other effects.

Figs. 3 to 7 inclusive are diagrams for explaining certain sea effects which are simulated in the present equipment. The diagram of Fig. 3 shows an echo-ranging ship 60 with a transducer 61 which projects a beam of sound such as 62. At the angular position 62 the beam just misses the right edge of the target 63 so that no echoes return. At the position 64 it just misses the other edge. At any position, or angle, between these two, an echo will be heard. The angle between these two positions 62 and 64 at which the echo becomes inaudible is called the target width, and is measured in degrees of angle. This target 63 as viewed from the echo-ranging ship 60 is progressing toward the right and so leaves a wake 65 to the left. This wake is also capable of producing echoes, and the part of the wake that produces the strongest echo lies behind the submarine 63 a distance which increases with the speed of the submarine. To the echo-ranging operator on ship 60 this part of the wake that returns the strongest echo constitutes the center of the wake. The angular separation of this center of the wake 65 from that of the submarine 63 constitutes the so-called "wake displacement" in the problems presented by the present apparatus and is measured in degrees of angle.

Conditions that control the droppler effect as observed by the echo-ranging operator are illustrated in Fig. 4. The total droppler imposed on an echo is the difference in the frequency of the signal transmitted by the transducer and that of the echo picked up by it and is a result of the motions of both the echo-ranging ship and the target with respect to the water. Because the speeds of the two craft are small compared to the speed of sound in water this total doppler consists, to a close approximation, of the sum of a doppler attributable solely to the motion of the operator's own ship, and another doppler attributable solely to the motion of the reflecting target. The echo-ranging operator observes only the target doppler. This situation arises from the fact that he never listens to his own sound transmission but only to the reverberation etc. that follow it. Since the reverberation consists largely of reflections from the water (which is stationary) it has "own doppler," that is the doppler due to the motion of the echo-ranging ship through the water. Accordingly, by comparing the pitch of the echo from the target-submarine with the pitch of the reverberation the operator observes the target doppler directly. At position 67 in Fig. 4 the target is headed slightly away from the echo-ranging transducer 66. That is, the target has a component of motion along the line of sight, which component is directed away from the echo-ranging ship, as indicated by the arrow 68. Under this condition the target doppler is down, that is the echo pitch is lower than the reverberation pitch. At 69 the target has a component of velocity toward the transducer and under this condition the target doppler is up. Thus target doppler observed in this manner does not indicate the rate at which the distance between the two craft is changing but only whether the target's course through the water has a closing inclination (toward the echo-ranging ship) or an opening inclination (away from it). The number of cycles per second that the frequency changes because of target motion depends both on the speed at which the target moves toward, or away from, the echo-ranging ship, and also on the frequency of the ping. The echo from the submarine wake has no doppler because the wake does not move.

If all pings are transmitted at the same frequency the tone of the reverberation, since it will exhibit own ship's doppler, will depend on the direction in which the transducer faces, that is whether it faces forward, on the side, or aft, and will depend also on own-ship's speed. According to one method of operating, the transmitting frequency is altered in such a manner that the reverberation pitch remains constant as the transducer is trained around. It is this type of operation that the present equipment simulates.

Fig. 5 consists of three diagrams showing how echo length depends on target aspect. Viewed from the hydrophone indicated at 70a in the left diagram the target 71a lies at an angle of approximately 45 degrees to the line of sight. A sound wave is approaching the target as indicated diagrammatically at 72a, and its left position is just beginning to encounter the wake 73a of the submarine. The center diagram shows the sound wave at 72b. Fragments 74 of the sound waves are indicated as having been reflected from the wake 73b back toward the echo-ranging hydrophone 70b. It is to be noted that because the left position of the advancing wave 72b reached the wake first, its left portions are ahead of the others in the returning wave and will eventually reach the hydrophone 70b first. These successive fragmentary reflections of the sound wave 72b will continue until the whole reflection is stretched out as at 74c and 75c in the right diagram. As these successive fragments return to the hydrophone 70c they actuate it successively, but since they necessarily overlap they combine in one long echo tone. When the submarine 73c has its beam turned directly toward the echo-ranging ship it presents a more nearly flat reflecting surface and produces an echo of shorter duration. Obviously a part of the duration of the echo comes from the duration of the original ping itself.

As is indicated also in Fig. 5, a part of the outgoing sound wave escapes the target, particularly at the slender stern of the submarine, and escapes also the narrow or fresh part of the wake because here both objects are small. This effect leaves a small gap 77 of low intensity (not necessarily zero) in the returning wave train so that the reflections from the submarine and its wake can be distinguished. When reflections are gotten from both in response to the same ping, as in Fig. 5, the reflection from the wake may come earlier or later than the echo from the submarine depending on whether the submarine's course is inclined away from the attacking ship (as shown) or toward it.

Fig. 6 illustrates the basic principle of the bearing deviation indicator (shown at 22 in Fig. 1). The transducer is made with two similar but independent halves which, though operated together for the transmission of the ping, are connected separately for the reception of the echo. If, for example, the transducer is pointed slightly to the left of the center of the target, as indicated in an exaggerated manner in Fig. 6, the left half will be farther from the target than the other and so will receive the echo later, and consequently the voltage generated in it by the same sound wave will be later in phase. For example, at 20 kc. per second the wave length of the sound in the water is approximately 3 inches. If the centers of the two halves of the transducer are 9 inches apart and the transducer is pointed 2 degrees off the center of the target the difference in the distances of the two halves of the transducer from the target is 0.3 inch or one-tenth of a wave length. Consequently the difference in electrical phase is one-tenth of a cycle, or 36 degrees. The present system includes means for simulating this phase-displaced, double output of the split hydrophone.

Fig. 7 shows how the relative bearing of the target changes during a depth charge attack. There the line 80 indicates the path of the target submarine and line 82 the path taken by the attacking surface ship in its attempt to drop the depth charges the correct distance ahead of the submarine so that the charges will sink to the submarine's depth and explode near it. The numbers 1, 2, 3, etc. on each track indicate equal intervals of time. For example, the center of the submarine is at the position 5 on the submarine's track 80 at the same time that the echo-ranging transducer of the attacking ship is at the position 5 on its track 82. The even spacing of these numbers on each track indicates that each ship is running at constant speed. The greater spacing on the attacking ship's track corresponds to its higher speed.

The relative bearing of the target is the bearing of the target measured relative to own ship's head. Since in this diagram the course of the attacking ship is constant, the changes in the orientation of the connecting lines between the two craft indicate directly changes in relative bearing. Notice that the line connecting the two craft at position 5 points farther to the left (counterclockwise) than does the line at position 2. Similarly the line inclines more to the left at positions 7 and 9, and at position 11 the relative bearing has swung through the stern. Thus it is seen that during this attack the relative bearing of the target has continuously swung counterclockwise, and moreover near the intersection of the two tracks the relative bearing has swung very rapidly. Actually sound contact usually cannot be maintained continuously during the whole of such an attack because, since the submarine will be considerably below the surface, the searching beam from the echo-ranging transducer does not spread downward enough to reach it at short range. Consequently at about the time that the relative bearing begins to fall rapidly astern, sound contact is lost, and when it is recovered the submarine will be on the opposite quarter. In the present invention advantage is taken of this period of lost contact to introduce large discontinuities in the bearings to overcome the difficulties of providing the rapid bearing changes required during the attack without impairing the accuracy of the presentation of the whole problem.

Fig. 8 is a chart of one of the problems built into the present machine. Here the target submarine follows a straight course at a constant speed of 5 knots as shown by the equal, numbered intervals along the track 84. The attacking ship begins the problem on a parallel course, and following the curved track 85 at a constant speed of 15 knots drops depth charges twice, once at approximately position 13 and again at approximately position 38. The problem ends with the two craft again on their original courses and bearings. Preferably all the problems in the machine begin and end with the two craft on this same course, at these same speeds, and at these same bearings from each other. Consequently any problem can be repeated at will without introducing discontinuities in the action, and furthermore at the end of any problem the equipment can be shifted to any other problem, also without interrupting the continuity. Each problem lasts 20 minutes. For convenience, the first half of each problem, that is the part from position 1 to 25, is called the attack and the second half of the problem the re-attack.

Figure 9B:
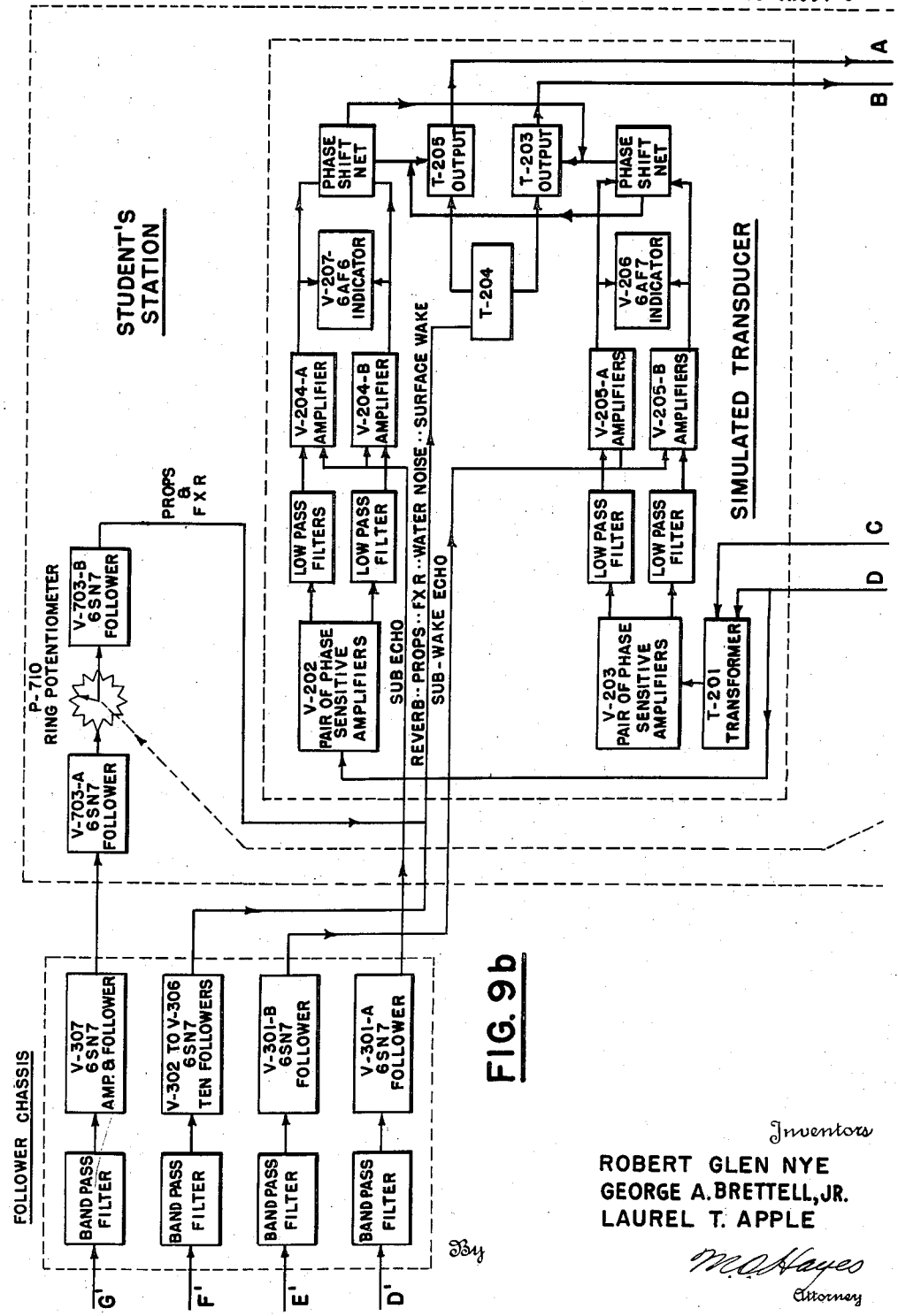
Figure 10C:
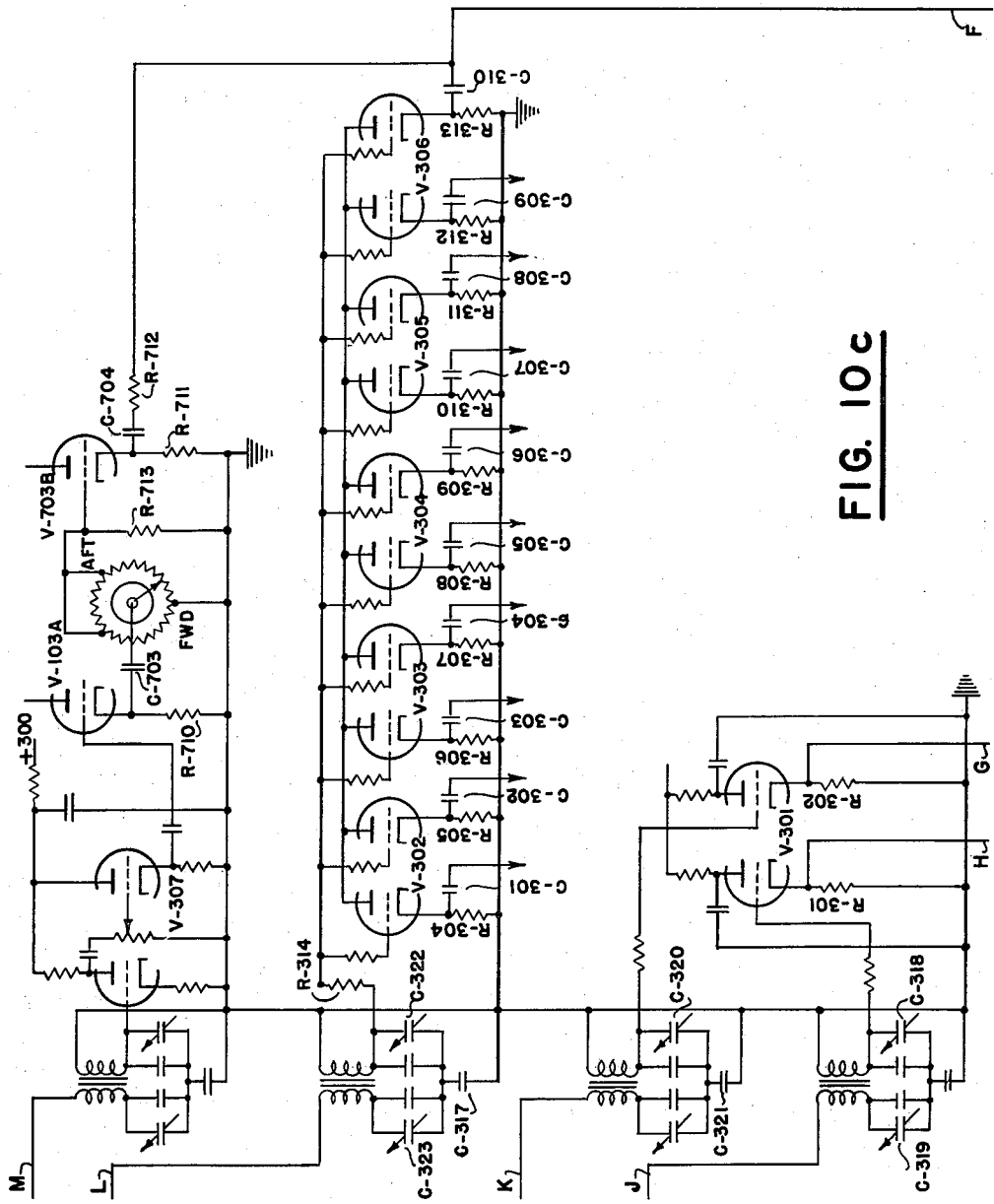

Fig. 9 is a block diagram, and Fig. 10 is an electrical schematic diagram of the complete system consisting of one instructor's station and ten identical students' stations (of which only one station is shown in the diagrams). Most of the elements of the system appear in similar positions in the two diagrams and they bear identifying names and numbers. In Fig. 9 the connecting lines with the arrowheads indicate the directions of the control functions. In reading the drawings, Fig. 9a to Fig. 9e should be assembled as shown in Fig. 9a, and Fig. 10a to Fig. 10f should be assembled as shown in Fig. 10g.

In order to understand some of the terms used in describing the keying sequence it is advisable first to examine Fig. 12 which shows the so-called "indicating range recorder" of the student-operator's control rack. This recorder includes rollers 86 for moving a sheet of chemically treated paper 87 downward as viewed by the student and includes also an electric stylus 88 carried on a block 89 which slides on rods 90. This block is urged to the extreme left position by a spring 91 and is adapted to be pulled toward the right by string 92 which winds on a drum 93 which is motor driven through the clutch 94. In actual sea operation, the clutch 94 engages and starts the stylus 88 moving toward the right just as the ping is transmitted. The stylus moves at a constant speed so that the distance it has traveled by the time the echo returns constitutes a measure of the range of the target. The stylus 88 is energized by the electric output of the operator's receiver to mark the chemically treated paper 87. Following the ping the receiver is reconnected to the transducer so that a mark 95 is made by the reverberation. Some time later another mark 96 is made by the echo. Still later the clutch 94 is released and the block 89 and stylus 88 "fly-back" to the extreme left position under the force of the spring 91. A scale, not shown, may be used with this recorder so that the operator can read off the range of the target directly in yards. During a run on the target, as from positions 1 to 13 in Fig. 8, the range continually shortens so that the pattern of reverberation and echo marks will appear somewhat as shown in Fig. 12. The top of the chart thus made corresponds to the latest time. Various other marks or traces also appear on this record, such as the echoes from wakes. It is convenient to so control the operation of the clutch 94 that the "fly-back" occurs a half second or so after the reception of the target echo. Consequently the stylus moves a few hundred yards, as measured on the scale of the recorder, beyond the echo mark before returning for the transmission of another ping. In the type of sea operation simulated by the present equipment this whole action is under the control of tactical equipment other than the operator's control rack. In the present invention this sequence of operation and the timing of the various echoes are controlled by a keying chassis which consists of a number of electronic trigger circuits and thyratrons with relaxation timing controls.

The sequence of the operations of the keying circuits is detailed in the diagram of Fig. 11. Both Fig. 11 and the block diagram of Fig. 9 indicate the line of control by which the various trigger actions respond to each other in their proper order.

Referring now to Fig. 10e, the action begins at the instructor's push-button switch S–3 labeled "Key." Closing this switch applies a high voltage through condenser C–108 to the grid of V–103A. The resulting voltage-rise triggers two triodes which constitute V–103 so that a voltage-rise is applied through C–120 to the cathode follower V–111A which in turn energizes coil K–101A of relay K–101. The triggering of tube V–103 occurs as follows: Normally the first section V–103A is biased to cut off and the second section V–103B is conducting. When the voltage rise is applied from the switch S–3 to the grid of V–103A, that section begins carrying current. The resulting drop in the plate potential of V–103A is transmitted through C–106 to the grid of the second section thereby reducing the current drawn there. This reduction in the current in V–103B tends to reduce the drop across the cathode resistor R–117 to thereby lower the potential of the cathode of the first section V–103A to further increase the current in that first section. This cumulative action causes the second section to abruptly cease conducting and the first section to begin conducting. It is this abrupt change that constitutes the trigger action. Actually this action carries the grid potential of the second section far below cut-off, and leaves a voltage across the coupling condenser C–106 which immediately begins to equalize itself by draining through R–109. As it does so it permits the grid potential of the second section V–103B to rise. When, as a result of this voltage rise of C–106, the second section begins to conduct, the tube triggers back by a process similar to the first triggering so that the second section is left conducting and the first section non-conducting. As it triggers back a drop in voltage is transmitted to V–111A to de-energize the coil of relay K–101. The coupling condenser C–120 is made large enough that V–111A cannot return to the non-conducting stage by itself before the tube V–103 drives it there.

The trigger action of tube V–103 has thus been initiated by a voltage rise from S–3 and has produced in turn a positive, square wave consisting of an abrupt voltage rise followed shortly thereafter by an abrupt voltage drop. This action has required perhaps 50 milliseconds and has occurred at the time that the simulated echo returned from the target. One pair of relay-contacts K–101B has closed for this 50 millisecond period to send an echo signal to the instructor's grading recorder, which will be described presently. Other contacts K–101C have closed to discharge a condenser C–101 to reduce the potential applied to the control grid of a thyratron V–101, and at the same time contacts K–101D have opened to interrupt the current through the thyratron. Thereafter when the relay K–101 dropped out contacts K–101C opened to let the condenser C–101 charge, and contacts K–101D closed to put the tube in condition for another operation. The time required for condenser C–101 to charge to a potential that will cause thyratron V–101 to fire is determined by the setting of resistor P–16 which constitutes the instructor's "fly-back" control. It determines the distance that the stylus 88 in Fig. 12 will move beyond the echo mark 96 before the clutch 94 is released. When the tube V–101 fires it applies a positive pulse to the trigger tube V–102, which operates just as tube V–103 did, to pick up relay K–103 momentarily. Two pairs of contacts K–103B and K–103C transmit a momentary positive voltage to the so-called "keying amplifier" in each student's station to open the clutch 94 (Fig. 12) electrically.

Other contacts on relay K–103 initiate a time delay at condenser C–110 which is terminated by the firing of thyratron V–104 which immediately fires a second thyratron V–110. This tube energizes two relays K–102 and K–104. The second of these has its only contact in the anode circuit of V–110 and as soon as it picks up it extinguishes the tube V–110 and so drops out again. However, the pick-up of relay K–104 is delayed because this relay is provided with a copper slug which constitutes a short circuited coil and which acts to delay the building up of flux in the relay's magnetic circuit. The relay K–104 thus determines the length of time that tube V–110 conducts and also the length of time that relay K–102 is energized. A connection from the cathode of V–110 conducts a positive pulse to the keying amplifier of each student's station for causing the clutch 94 in Fig. 10a to re-engage.

One pair of contacts K–102B in Fig. 10e on the relay K–102 momentarily apply 150 volts to the condenser C–8A in Fig. 10f which controls the reverberation sound. Another pair of contacts K–102C in Fig. 10e momentarily close to discharge condenser C–129 for the lost-contact control. Another contact K–102D momentarily closes to apply 150 volts to the first grids (control grids) of tubes V–4, V–11 and V–12 in Fig. 10f for controlling the attenuation of echoes with an increase of range. These actions will be explained presently.

Two other pairs of contacts K–102J and K–102K in Fig. 10e on the relay K–102 extinguish thyratron V–114 and start the condenser C–125 charging through rheostat P–17 which constitutes the instructor's manual control for the range of the extraneous echo, as from a surface wake. This action fires thyratron V–114 to operate the trigger tube V–113, the output pulse from which goes to the second grid of V–4 to sound the simulated echo from a surface wake. The duration of this pulse is determined by rheostat P–18 which constitutes the instructor's control for the trace length of this echo, that is, for the length of the mark it will produce on the student's recorder of Fig. 12.

Two other pairs of contacts K–102G and K–102H in Fig. 10e similarly start condenser C–18 charging to control a thyratron V–109 which in turn triggers V–108 to send a pulse to V–12 in Fig. 10f for sounding the echo from the wake of the target submarine. Here the charging rate of condenser C–18 in Fig. 10e is controlled by rheostat P–402 and tube V–105B. The grid of V–105B is biased by the voltage drop across P–402, and the current through V–105B is held so low that the tube operates on the so-called toe of its characteristic curve so that this current is controlled only by the grid voltage, that is the voltage across P–402. Under this condition the time required for charging condenser C–18 to a given voltage is substantially proportional to the value of the resistance presented to the circuit by P–402, which constitutes the range control for the target's wake and is operated by the motor driven program generator. Resistor P–404B, also driven by the program generator, controls the duration of the echo.

A similar circuit controlled by contacts K–102E and K–102F in Fig. 10e controls the simulated echo from the target submarine itself. The resistor P–401 controls the range and P–404A the duration of the echo. P–404A and P–404B are operated together by the program generator to control the duration of the two echoes in accordance with the aspect of the target as was explained in connection with Fig. 5. The output pulse goes to tube V–11 in Fig. 10f to sound a target echo and it also goes to trigger tube V–103 in Fig. 10e for initiating the repetition of the timing cycle. Notice that when thyratron V–106 fires, V–107 triggers immediately to energize the echo pulse, and that the onset of this pulse immediately triggers V–103 for transmitting a pulse to V–111A for controlling relay K–101, but that the durations of the two pulses produced by these two triggers, tube V–107 and V–103, are controlled independently.

This automatic timing or keying sequence can be stopped simply by holding the push-button S-3 closed until V-107 triggers. The closed switch S-3 will short circuit the output pulse and prevent it from triggering V-103.

Since this timing system depends on the operation of certain trigger circuits etc. in proper order and requires that each one remain quiescent until the proper pulse actuates it, it is possible for an extraneous voltage to start a second pulse around the chain of control so that, for example, tubes V-107 anad V-102 would be triggering at about the same time and so cause a faulty operation of the whole system. However, it is improbable that this would happen because of the large voltages required for actuating the various triggers and thyratrons. Moreover there are only two long time-delays in the whole chain, namely the delay imposed by condenser C-101 on the firing of V-101 (delay before fly-back) and that imposed by condenser C-111 on the operation of V-106 (delay before the target echo). Consequently, faulty operation could not persist unless these two delays were substantially equal, because under any other condition one pulse would promptly overtake the other and thereby automatically restore proper operation.

The sound effects originate in the circuits shown in Fig. 10f. Tube V-1 is a gas filled tube. It is connected directly to a fixed load resistance across the 300 volt D.C. supply. The inherent irregularities of this gas current enable it to serve as a generator of random frequencies for noise simulation. This noise output is amplified at V-2 to drive a resonant circuit which includes the inductor L-1 which is tuned at approximately 4 kilocycles per second. This resonant circuit, or tank, is coupled loosely through condenser C-4 to another similar resonant circuit which includes the inductor L-2. These two circuits tend to oscillate independently, but they pass power back and forth through the loose coupling so that in each circuit the amplitude fluctuates. This fluctuating signal constitutes the reverberation tone.

A second gas tube V-15 in Fig. 10f is energized not from the D.C. supply, but rather from the 120 cycle output of the rectifier V-7. The noise output of this tube consists of random frequencies chopped at 120 cycles. This constitutes the so-called FXR tone to simulate a towed noisemaker. A switch S-1 permits the instructor to select the output of either V-15 or V-1 to be amplified at V-8A. A part of this signal goes through the instructor's water noise intensity control P-8 and is further amplified at V-8B. The output from the cathode of this tube constitutes the so-called "water noise," that is the rushing sound that constitutes the background of the sounds to which the echo-ranging operator listens. The frequencies of interest here are those near 4 kc. When the switch S-1 takes the input for V-8A from the chopped output of V-15, the plate voltage of V-8B is taken off through another pole of S-1 to transformer T-5 to constitute the FXR or noisemaker output, where the frequencies of interest are those near 20 kc.

It should be noticed that whenever the switch S-1 takes the noise tone from V-15 to simulate FXR operation, the chopped FXR noise is put also in the water noise circuit, because when a towed noisemaker is in operation at sea its tone can be heard to some extent from all directions and therefore it constitutes a part of the background noise.

A multivibrator V-10 in Fig. 10f operates at a frequency suitable for propeller beats, as for example at 3 cycles per second. This frequency is intended to be constant during the operation of the problem, so the double resistor P-10 which controls the frequency of operation is not located on the instructor's control panel. This propeller beat, and also noise from tube V-8A, are fed through the double potentiometer P-6 to the first two grids of the mixer tube V-9. The output of V-9 accordingly consists of sound pulses at about 3 cycles per second, each pulse which consists of the noise tone from V-8A. It is fed to transformer T-5. This use of the FXR tone in the propeller sound has been found to provide a good simulation of sea conditions.

Tube V-6 in Fig. 10f operates as an oscillator with its frequency controlled by the resonant circuit which includes inductor L-9 and condensers C-38 and C-39. This oscillator generates the echo tone, and its actual frequency of operation is adjustable slightly above and below 4000 cycles per second by the doppler potentiometer P-406 which is mounted on the program generator which will be described presently.

The reverberation tone is conducted from L-2 in Fig. 10f to the first grid of modulator V-3. A square pulse, from contacts K-102B in Fig. 10e on the keying chassis puts a charge on condenser C-8A in Fig. 10f, which then drains off through P-2 and R-9 in from one-quarter second to 3 seconds. The resistor P-2 is the instructor's "reverberation range" control for regulating this decay rate. The voltage on condenser C-8A is applied through inductor L-2 to the first grid of V-3, which is of the so-called "super control" or variable mu construction. Normally this grid is biased 150 volts below cut off. When the reverberation pulse is applied to C-8A, tube V-3 begins passing the reverberation tone with high amplitude and then as the charge drains off C-8A, the reverberation tone diminishes in amplitude, and finally cuts off entirely when about 40 volts have drained off C-8A. The output of the reverberation modulator V-3 and also the water noise from V-8B are applied to a ring modulator which includes the varistor VAR-1 for converting the frequency from 4 kc. to 20 kc.

The reverberation tone from L-2 in Fig. 10f is applied also to the first grid of a submarine-wake modulator V-12, and through P-4 to the first grid of a surface wake modulator V-4. The condenser C-12 prevents the bias voltage on condenser C-8A from affecting these two tubes. (A bias voltage is, however, applied to these grids for simulating range attenuation as will be described presently.) A square wave pulse from trigger tube V-113 on the keying chassis in Fig. 10e is applied through a filter, which includes R-27 in Fig. 10f, for causing V-4 to pass the reverberation tone for the short duration of the square wave. The output of this tube V-4 then constitutes an echo from a surface wake, that is, from a wake produced by some surface ship. This output goes to transformer T-4 where its frequency is converted by varistor to 20 kc. This signal and also the reverberation and water-noise from T-2 then go to the instructor's output intensity control P-5. The instructor's control P-4 controls the amplitude of the reverberation tone that is imposed on the first grid of V-4 and thereby controls (in part) the intensity of the echo from the surface wake.

Modulator V-11 in Fig. 10f controls the echo from the simulated submarine target and modulator V-12 controls the simulated echo from the wake of the target. The tone for the submarine-echo consists of the pure note from the oscillator V-6 and is applied to the first grid of V-11. The tone for the echo from the wake consists of the reverberation tone and is applied to the first grid of V-12 as already described. Applied also to the first grid of each of V-11 and V-12, and also V-4, is the range attenuation voltage for progressively increasing the bias applied to these grids after each simulated ping so that the later the echo occurs the weaker it will be.

This action is initiated by contacts K-102D on the keying chassis in Fig. 10e which close momentarily during the simulated transmission of the ping to discharge condenser C-8B in Fig. 10f and reduce the bias on these three grids to a low value. Thereafter the voltage on these control grids progressively drops to some lower voltage (to increase the bias) at a rate which is determined by condenser C-8B, resistor R-158 in Fig. 10e, and the setting of potentiometer P-106 (not one of the instructor's controls). Since these grids are of the super-control construction, this action progressively reduces the amplification of these three echo modulators V–4, V–11 and V–12 in Fig. 10f so that the later an echo occurs the weaker it will be in simulation of the weakness of echoes returned by distant objects. The output of V–11 is controlled by a square pulse from V–107 on the keying chassis in Figure 10e, which is applied through a filter that includes R–43 in Fig. 10f. This filter takes some of the abruptness off the onset and decay of the square pulse to prevent an audible thump from appearing in the output of the modulator. Similarly, the output of V–12 is controlled by a square pulse from trigger tube V–108 in Fig. 10e.

An additional control voltage applied to the suppresser grids of modulators V–11 and V–12 in Fig. 10f prevents echoes from occurring at short range. At the time of the simulated ping, condenser C–129 in Fig. 10e on the keying chassis is discharged by relay contacts K–102C. This action carries these grids about 150 volts below cathode potential. Thereafter condenser C–129 recovers its charge through resistor P–19 in Fig. 10f which constitutes the instructor's depth-of-submarine control. The length of time that is required for the suppresser grids of these tubes V–11 and V–12 to come to a high enough potential to permit the tube to conduct corresponds to the minimum range at which an echo can be obtained from the submarine at its presumed depth.

The outputs of the modulators V–11 and V–12 in Fig. 10f go to transformers T–9 and T–10 where their frequencies are converted to 20 kc. and thence to output potentiometers P–11 and P–9 which are operated together to constitute the instructor's Target Intensity control.

Tube V–5A in Fig. 10f operates as a Colpitts oscillator at 24 kc., and drives V–5B as a cathode follower which in turn drives transformers T–3 and T–8 which drive the four ring modulators VAR–1 to 4 for frequency conversion from 4 kc. to 20 kc. The instructor's switch S–2 permits the frequency to be shifted to 23.5 or 24.5 kc. so that the students will be required to re-tune their receiving amplifiers.

The output of transformer T–5 in Fig. 10f, which includes the FXR and propeller sounds, goes to a series-resonant circuit which acts as a band pass filter (mid-frequency 20 kc.) and also as a voltage booster. It goes thence to an amplifier and cathode follower V–307 in Fig. 10c to supply all the students' stations. A single circuit for supplying this signal to all of the student's stations is satisfactory because isolation between stations is provided by vacuum tube circuits at each station.

The output from P–5 in Fig. 10f, which includes reverberation, water noise, and surface wake, goes through a similar series-resonant circuit and then drives ten separate cathode followers in tubes V–302 to V–306 in Fig. 10c, each of which supplies this signal to a separate student's station. The outputs from P–9 and P–11 in Fig. 10f, the submarine-wake echo and the submarine echo respectively, go through similar series-resonant circuits to two cathode followers, each of which employs half of tube V–301 in Fig. 10c, and supplies all the students' stations.

The functional organization of the motor-driven program-apparatus is best indicated in the block diagram of Fig. 9. A problem motor B–401 and a reset motor B–402 in Fig. 9c both drive into a differential which in turn drives a set of problem cams. The drive motor requires about twenty minutes to turn the cams one revolution in the forward direction for going through one attack and re-attack of a problem such, for example, as that shown in Fig. 8. The reset motor B–402 drives the cams in the reverse direction at a much higher speed. Consequently, if the instructor should want to repeat a small part of the problem he need only energize the reset motor B–402 to reverse the problem, preferably without stopping the motor B–401 because the bearing controls are energized from the same circuit.

The eight cams required for one problem control effects as follows, all as indicated in Fig. 9c: The first cam drives selsyn generator G–401 for developing the course of the attacking ship. It simply drives indicators, or so-called "gyro compass repeaters" at the instructor's station and each of the student's stations. The second cam drives rheostat P–402 for controlling time required for charging condenser C–18 on the keying chassis, that is for determining the range of the submarine's wake. The third cam drives rheostats P–404A and P–404B to control the duration, or trace length, of the echoes from the submarine and its wake in accordance with the angle that the submarine's course makes with the line of sight from the echo-ranging ship as was explained in connection with Fig. 5. The fourth cam drives the tapped transformer T–402 for developing a voltage that is proportional to the angular displacement, or bearing displacement, of the submarine's wake from the submarine. (See Fig. 3.) The fifth cam drives potentiometer P–406 to control oscillator V–6 in Fig. 9c for imposing doppler on the echo from the submarine. The sixth cam drives potentiometer P–401 in Fig. 9c to control the charging time of condenser C–111 in Fig. 9d in accordance with the range of the target-submarine. The seventh cam operates two selsyn generators G–402 and G–403 in Fig. 9c in accordance with the relative bearing of the target, that is the number of degrees that the target lies off the bow of the echo-ranging ship. Generator G–402 simply repeats this target bearing to an indicator on the instructor's panel. The eighth cam drives the tapped transformer T–401 in accordance with target width. It controls the voltage supplied to G–403 and T–402. The actions of the bearing controls T–402, G–403, and T–401 will be explained presently.

As is shown in Fig. 14 the three cams that control a single effect (as for example cams 131, 132 and 133 for "own ship's course") in the three problems are mounted next to each other and the shaft 134 carrying the cams is shiftable axially for moving each separate set of cams under the follower. For this purpose each follower 135 is equipped with a notched hub 136 and is adapted to be engaged by a similar, notched collar 137 on the shaft 138 so that a rotation of the shaft 138 (by means of handle 139) will lift all the followers off the cams. Handle 142 and gear 143 control the axial adjustment of shaft 134. Fig. 15 shows the follower 135 and the manner in which it drives the electrical control element. The cam shaft 134 is driven by a gear 144 in Fig. 14 which it engages by means of a key 145. This gear is prevented from moving axially with the shaft 134 by a flange 146 which is guided by a bracket 147 secured directly to the frame of the structure. A cam 148 also supported on this gear 144 controls the two switches S–401 and S–402.

As shown in Figs. 9 and 10, switch S–401 controls a relay K–401 which in turn reverses the voltage applied to G–402, G–403, T–401 and T–402. The reversals occur at the positions 13 and 38 indicated on the problem chart of Fig. 8, and will be explained in connection with Figs. 25 and 28. The switch S–402 changes the pilot lights I–602 and I–603 at the positions 1 and 26 of the problem for indicating the attack and re-attack phases.

A pair of push-button switches S–601 in Fig. 9c and Fig. 10d control relay K–601 which in turn controls all the electric power for the instructor's station. Push-button switches S–602 control relay K–602 for energizing problem motor B–401, and push-button switches S–603 control relay K–603 for operating the reset motor B–402.

The training control at each of the students' stations includes the hand wheel 20 which drives a bug ring 21 for indicating to the student the bearings to which he has trained his simulated transducer. (See Figs. 1 and 1a.) It drives also, among other things, a ring potentiometer P–710 in Fig. 9b which controls the FXR and propeller sounds. The signal from V–307 goes through V–703A and thence to ring potentiometer P–710 which shorts out the signal when the student's simulated transducer is trained forward, and passes maximum signal when the hydrophone is trained aft. The output from V-703B goes to transformer T-204 in the student's simulated transducer which will be described presently.

Also driven by the training control wheel 20 in Fig. 9a is the control transformer G-701 which is energized from the selsyn generator G-403 in Fig. 9c. For any setting of G-403 there will be two settings of control transformer G-701 (Fig. 9a) at which there will be zero output. One of these is taken as the on-target bearing. The other will appear in the opposite direction and, although it will give an extraneous indication to the student, the instructor can easily control the conduct of the problem for preventing difficulties on this account. As the student trains away from this on-target position the output voltage from G-701 will increase according to the sine of the angle by which he is off the target. The phase, or so-called polarity of this voltage, as compared to the power line will be opposite for the two sides of the target.

Figure 16:
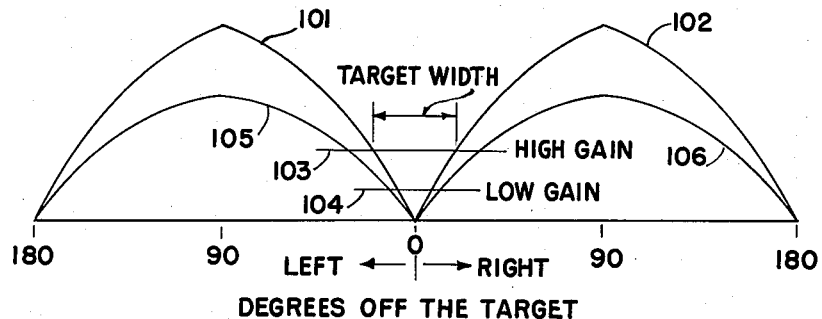

The width of the target as observed by the student, that is the number of degrees of bearing angle between the two positions at which he loses the echo on the two sides of the target as explained in Fig. 3, is controlled by varying the magnitude of the voltage from this transformer G-701 in Fig. 9a. As shown in Fig. 16, the magnitude of the voltage output of the control transformer increases as the student trains either right or left from the on-target bearing, as for example as shown by the curves 101 and 102. At some one setting of the student's receiver-gain control the voltage output of the transformer G-701 will have to fall below the line 103 in order for an audible signal to come through to the student's speaker. The length of this line that is cut out between the two curves 101 and 102 indicates the target width under these conditions. If the student lowers the gain setting of his receiver, a stronger signal will have to come through for him to hear it and consequently the voltage from the control transformer G-701 will have to fall to a lower value such as that indicated by the line 104 in order that he may hear the target echo. Since the curves 101 and 102 cut out a shorter segement of the line 104, the student will receive echoes over a narrower angle with the lower setting of his gain control. Now if the voltages supplied to the control transformer G-701 are all made lower, its output will follow lower curves such as 105 and 106. As may be seen from Fig. 16 these lower curves 105 and 106 cut out longer segments of the lines 103 and 104 so that the student observes a wider target.

This target width control is effected by the cam-driven, tapped transformer T-401 in Fig. 9c on the program generator. It controls the magnitude of the voltage supplied to the selsyn generator G-403 which in turn energizes the control transformers G-701 in Fig. 9a for all of the students. The maximum voltage from the student's control transformer, that is the value observed at 90 degrees off the target (see Fig. 16), is approximately equal to the voltage supplied to G-403 (Fig. 9c).

The output of this control transformer G-701 is imposed on the grids of the two triodes which constitute the two halves of tube V-202 in Fig. 9b of the student's simulated transducer. Imposed on the cathodes of these two triodes are A.C. voltages of opposite phase, derived from the 6 volt heater circuit for the tubes. Thus the A.C. for the cathode of one triode comes through R-218 and C-204 (Fig. 10b). That for the other comes through R-219 and C-205. Potentiometers P-205 and P-206 bias these triodes approximately to cut-off so that with no voltage on the grids, the A.C. at the cathodes makes each tube conduct every other half cycle. The clipped outputs are filtered at R-233 and R-234 to provide bias voltages for the grids of two triodes that constitute the two halves of V-204. These voltages, when there is no signal on the grids of V-202, bias the two halves of V-204 approximately to cut-off so that under this condition they clip the echo signal applied to their grids and pass about half of it. P-205 and P-206 must be adjusted to make the outputs of the two halves of V-204 equal. V-207 (Fig. 10b) is a cathode ray indicator for use in making this adjustment.

When a voltage from control transformer G-701 in Fig. 10a is applied to the grids of V-202 in Fig. 10b, it will have the same phase as the voltage at one cathode and the opposite phase from the voltage at the other. Therefore, the output from one triode will increase and that from the other decrease, and since these outputs are clipped, the D.C. components will be increased and decreased too. The resulting change in the biases applied to the two triodes of V-204 causes one to pass a greater echo signal and the other a smaller one. The fact that these output signals are clipped is immaterial because the student's receiver, into which they operate, includes a resonant circuit that restores the complete wave.

Thus for zero voltage from the control transformer G-701 in Fig. 10a the signal output from the two halves of V-204 (Fig. 10b) are equal in magnitude. If the student trains off the target to one side, one of these will increase its signal at the expense of the other. If the student trains off the target on the other side the other tube passes the stronger signal. This operation of increasing and decreasing the outputs of V-204 in response to right and left deviations at G-701 in Fig. 10a is similar to that of the system described and claimed in application Serial No. 582,352, filed March 12, 1945, now Patent No. 2,545,191.

Connected across the output leads 121 and 122 from the two halves of V-204 in Fig. 10b are two phase-shifting branches, one for imposing a phase lead on any unbalanced voltage component and the other a phase lag. These consist of resistors R-241 and R-242 and condensers C-215 and C-216. Notice that if leads 120 and 121 have the same signal voltage with respect to ground, no current will flow through the condenser and resistor because no voltage will appear across them. Consequently for a balanced (on target) signal the output connections 123 and 124 from the phase shifting branches will have the same signal voltage with respect to ground as do the two points 121 and 122. Thus it is clear that when the two signals are of equal voltage no phase-shifting action occurs. It is also true that when the signals are unequal they may be considered as consisting of a balanced signal component plus an excess signal on one side, and that the balanced component will contribute no phase-shifting effect.

Figure 17:
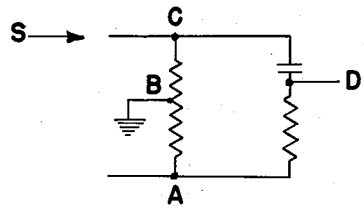
Figure 18:
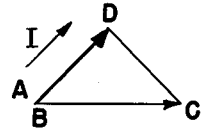
Figure 19:
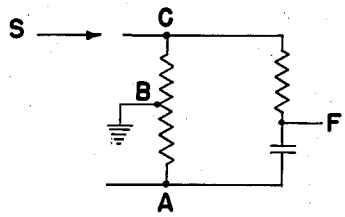
Figure 20:
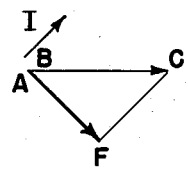

Consider an excess signal applied to terminal C in Fig. 17, that is between the ground terminal B and the terminal C. Since we are considering only the unbalanced voltage, we assume zero voltage between the terminals A and B. To find the phase and magnitude of the voltage at output terminal D with respect to ground it is convenient to construct the time phase diagram of Fig. 18. The voltage BC is laid off toward the right to indicate zero phase, that is the phase of the incoming signal. Perceiving in advance that the current vector I in the branch through the condenser and resistor will lead this voltage by 45 degrees (because the reactance of the condenser is equal in magnitude to the resistance of the resistor) we draw in the vector AD at an angle of 45 degrees above the vector BC. A and B coincide on this voltage diagram, because voltage AB is zero. This vector AD must be of such length that another vector DC for closing the triangle will lag 90 degrees behind the current, that is 90 degrees behind the vector I (and also 90 degrees behind AD). Thus the output due to the unbalanced voltage BC produces a leading component of voltage BD in the output from this phase shifting branch. Figs. 19 and 20 similarly show that this same unbalanced voltage BC will produce a lagging component BF in the other phase shifting branch. A similar analysis for an excess voltage at A shows that in that situation voltage BD lags and BF leads.

Figure 21:
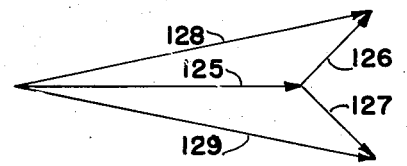

Fig. 21 shows the total effect. The vector 125 is the balanced voltage-component. It has suffered no change in the phase shifting branch. Vectors 126 and 127 are the lagging and leading voltage components which are added to this in the respective branches. The vectors 128 and 129 constitute the two final output voltages of the system, one of which is applied to each of the two transformers T-203 and T-205, the outputs of which simulate the outputs of the two halves of the split transducer shown in Fig. 6.

The signal from V-306 in Fig. 9b containing the reverberation, water noise, etc. is passed through transformer T-204 and then is added (at opposite phases or polarities) to the outputs of the two transformers T-203 and T-205. It has been found that this arrangement for introducing this noise in the simulated transducer circuit provides a satisfactory synthetic signal and visual indication in the student's station.

This system for shifting the relative phases of the two signals as the student-operator trains across the target is useful also in the system of application Serial No. 535,-858, filed May 16, 1944.

It has been found that under certain conditions, the impedance looking into transformer T-203 or T-205 in Fig. 10b from the load side, tends to vary with the voltage applied to the grids of V-202, and that this effect unbalances the reverberation signals etc. that are applied through transformer T-204. To correct this difficulty, shunts R-243 and R-232 are connected across the primaries of T-203 and T-205. The substantial load thus imposed on the phase-shifting branches (e.g. C-215, R-242) reduces both the magnitudes and phase displacements of the output voltages, but these losses are anticipated by the high amplification and sensitivity built into the earlier portions of the control.

The voltage from the control transformer G-701 in Fig. 10a similarly controls the simulated reception of the echo from the submarine-wake by the student's equipment. However, for this purpose, there is added to the voltage from the control transformer, the "displacement voltage" which is supplied to T-201 (Fig. 10b) by transformer T-402 (Fig. 10d) of the cam-driven program apparatus. The addition of this displacement-voltage requires that the student train slightly off the target to get a voltage in the control transformer that balances this displacement voltage in order to get a balanced signal for the echo from the target wake.

The transformer T-402, like G-701, is supplied from transformer T-401 in Fig. 10d which controls the target width. This arrangement is necessary if the bearing displacement is to be independent of target width. For example, at the bearing of the submarine-wake, the displacement voltage from transformer T-201 (Fig. 10b) is exactly equal in magnitude, and opposite in phase, to the output of the student's control transformer G-701 (Fig. 10a). If only the voltage from the control transformer were changed this balance would be disturbed. In the present construction, they are changed in the same proportion, by supplying them from the same source T-401, so that they continue to balance each other regardless of changes in the supply voltage.

The output from the student's simulated transducer, that is the outputs from the two transformers T-203 and T-205 in Fig. 10b, are conducted to the so-called receiver-amplifier of the student's control rack. This rack is of a standard ship-board type and will not be described in detail. The amplifier receives signals at supersonic frequencies, such as 20 kc. at which the present equipment operates, supplies a heterodyned 800 cycle signal to the student's speaker, and supplies signals also to the bearing deviation indicator 26 and indicating recorder 24 in Fig. 10a.

The deviation indicator 26 includes a cathode-ray oscilloscope on which the trace sweeps upward following each ping and deflects laterally in accordance with the unbalanced component of the input signal. Thus when the student has trained slightly off the target, in simulation of the situation shown in Fig. 6, the outputs from the two transformers T-203 and T-205 in Fig. 10b are slightly out of phase. The student's receiver responds to the phase difference and causes the echo trace 27 to deflect to one side or the other depending on which signal lags. This device thus supplies the operator with a sensitive indication of his deviations from the center bearing of the target. It has been found that the traces produced on this indicator by the present invention constitute an excellent simulation of actual sea operation.

The recorder 24, which was described in connection with Fig. 12, has the audio signal from the receiver applied to its stylus 88 in Fig. 12 so that whenever a strong signal comes through, as for example, the sound of the reverberation or echo, the signal voltage at the stylus 88 marks the chemically treated paper.

The output from the control transformer G-701 in Fig. 9a and Fig. 10a also operates a grading amplifier. The control transformer output is amplified at V-701 and then applied to the plates of the two triodes which constitute V-702. The grids of these triodes are energized from opposite sides of the heater circuit, the center of which is grounded, so that in one of these tubes the grid voltage will have the same phase as the plate voltage and in the other will have the opposite phase. Consequently one or the other of these tubes will conduct depending on the phase of the output from the control transformer, that is depending on whether the student has trained right or left off the target. The cathode outputs from these two triodes are applied to stylii of the instructor's grading recorder, which is shown best in Fig. 13. A sheet of chemically treated paper 110 is moved slowly by a motor 111 under a number of stylii of which a group of three is assigned to each student. The central stylus 113 of each group receives the marking signal from the relay contacts K-101B in Fig. 10e on the keying chassis to mark the individual echoes. These echo-marks appear regardless of whether the student hears the echo or not. The other two stylii 114 and 115 in Fig. 13 receive the cathode outputs from V-702 in Fig. 10a of the grading amplifier. When the student trains to the left of the target bearing, stylus 114 leaves a trace to the left of the echo marks. When he trains to the right of the target bearing, stylus 115 leaves a trace at the right of the echo mark.

Operated also by the student's training control 20 is a ring potentiometer or position transmitter P-711 in Fig. 10a. Its output drives a so-called D.C. selsyn at the instructor's station to indicate to the instructor the relative bearing to which the student has trained. The instructor has a separate one of these indicators for each student, and since all students are listening to simulated echoes from the same target they should, if they are performing properly, all be trained to substantially the same relative bearing. The actual bearing of the target is indicated to the instructor by a selsyn motor B-612 in Fig. 10d driven by selsyn generator G-402 which in turn is driven by the same cam that drives the selsyn G-403 which energizes the student's control transformer.

The power controls and pilot lights which constitute a standard part of the ship-board control rack are controlled to provide correct indications. Thus the pilot lights entitled "motor generator" and "hoist equipment" are energized from the instructor's station whenever that is energized. The on-off push-button switches at the student's rack control in relay K-701, in Fig. 10a for controlling the power to the rack. Relay K-701 also controls pilot lights entitled "lower limit" and "hoist limit" which are energized only from the instructor's station.

A relay K-702 in Fig. 10a at each student's station opens two of the leads to the compass selsyn whenever the power is turned off at the student's rack. Similarly a relay K-604 in Fig. 10d at the instructor's station opens two of these leads whenever the power is turned off at the instructor's station. The purpose of these relays is to prevent the compass selsyns from operating as transformers for feeding power. For example, if the student's station had the power shut off but had its compass selsyn energized from the instructor's station, the selsyn would attempt to act as a transformer to energize all of the equipment at the student's station.

The amplifier and the controls for the inter-communicating system are located at the instructor's console. The instructor is provided with a switch S-605 in Fig. 10g which permits him either to talk or to listen to the students, and a switch S-607 for selecting which student he will communicate with. The instructor has a loud speaker LS-601 and each student has a smilar speaker which functions as both the microphone and the speaker for the system.

Figure 22:
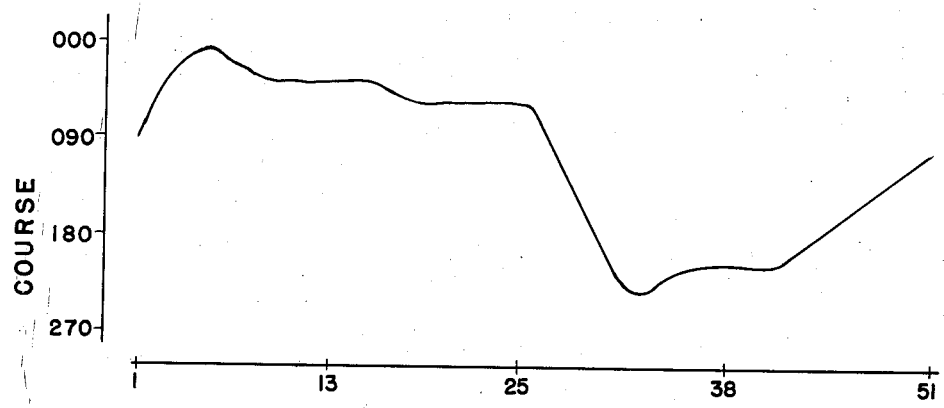

Figs. 22 to 29 inclusive show the motions that must be developed by cams 1 to 8 respectively (see cam numbers in Fig. 9) in order to present the problem charted in Fig. 8. In each of these curves, time is plotted along the horizontal axis and indicated by the position numbers 1 to 51 corresponding to those marked on the chart of Fig. 8. Fig. 22 shows the course of the attacking ship when the course of the submarine is east. The actual course is immaterial to the problem because none of the other parts of the problem depend on it. Consequently, the problem may be altered from time to time simply by rotating the compass selsyn G-401 (which is driven by cam No. 1) in its mounting. The rotation of this selsyn is equivalent to a rotation of the chart of Fig. 8 with respect to the compass directions.

Figure 23:
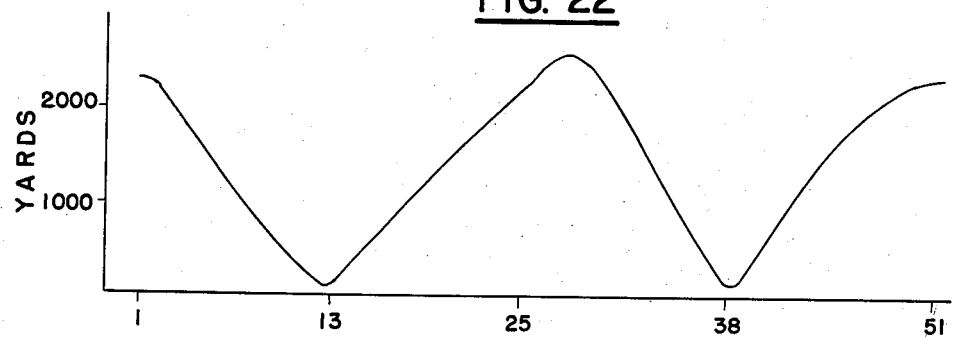
Figure 24:
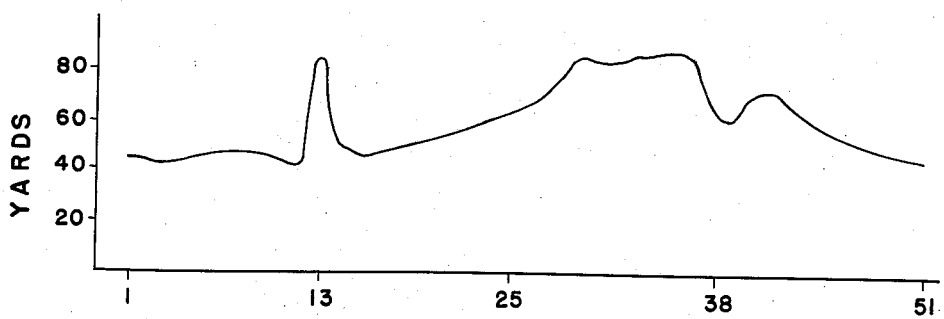

Fig. 23 shows the range of the target's wake, that is, its distance from the student's ship. Fig. 24 shows the echo length measured in yards. In the operation of the student's "indicating recorder," which is shown in Fig. 12, the length of the mark or trace that indicates the echo corresponds to the length of time that the echo tone lasts. Since this recorder carries a range scale in yards it is convenient to measure this echo length in yards. Actually the length so measured is the length of the wave train of the echo in the water.

Figure 25:
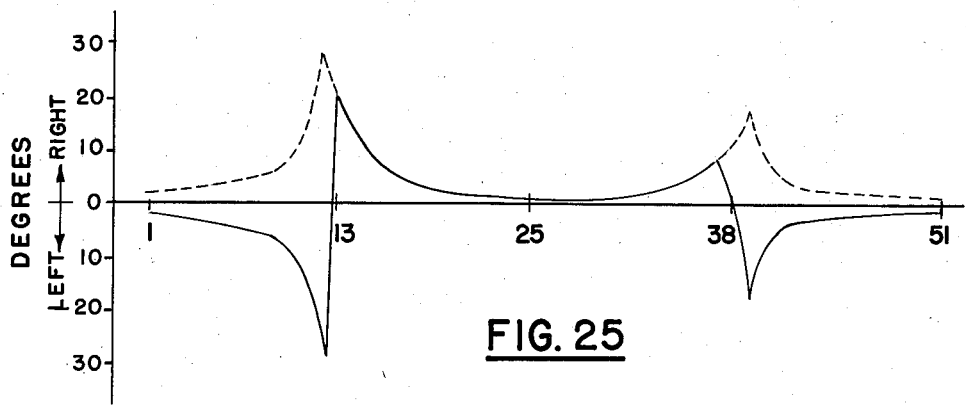

Fig. 25 shows the wake displacement, that is the number of degrees difference between the bearings of the target and its wake. This curve is so steep at the positions 13 and 38 that it would be difficult to construct a cam that would properly reproduce this rapid change and also accurately reproduce the changes during the other parts of the problem. This difficulty is overcome in the present invention by employing a switch S-401 (Figs. 9c and 10d) to operate relay K-401 for reversing the voltage applied to the wake displacement transformer T-402. This reversal of polarity takes place at the positions 13 and 38 of the problem so that the actual motions that must be developed by the cam during the first and last quarters of the problem are indicated by the dotted lines in Fig. 25.

Figure 26:
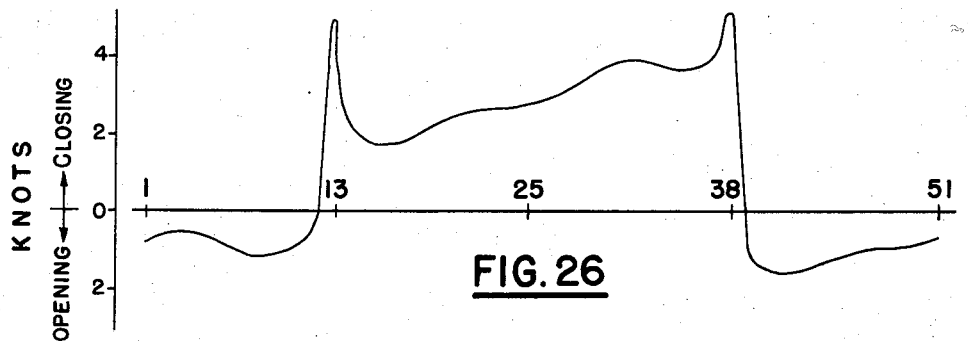
Figure 27:
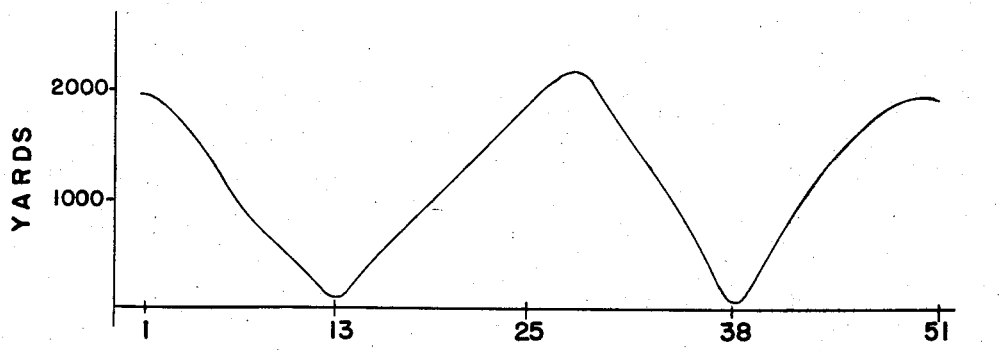

Fig. 26 shows the doppler measured in knots. This is target doppler as was defined in connection with Fig. 4. Fig. 27 shows the target range. As may be expected, this curve is only a little different from that of Fig. 23 which shows the range of the target's wake.

Figure 28:
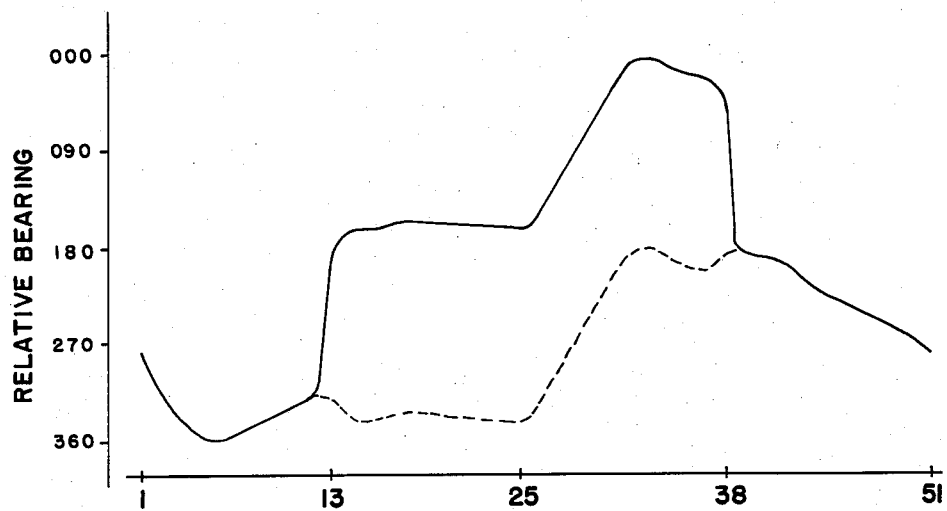
Figure 29:
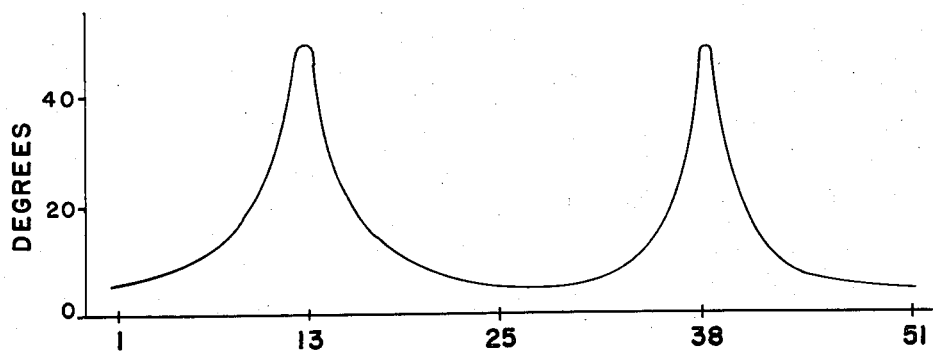

Fig. 28 shows the changes in relative bearing of the target from the attacking ship, that is the bearing as measured in degrees from the attacking-ship's heading. Because of the rapid bearing changes that take place at the time of the attack, and which were explained in connection with Fig. 7, this curve is exceedingly steep near positions 13 and 38. Here again it would be difficult to provide a cam that would produce these rapid changes and also provide accurate operation at other parts of the curve. To overcome this difficulty the voltage applied to the rotor of selsyn G-403 is reversed at these points by relay K-401. This reversal effects a shift of 180 degrees in the relative bearing indicated by the selsyn. Consequently, with this arrangement the actual motion that must be developed by the cam between the positions 13 and 38 is that indicated by the dotted line in Fig. 28. Fig. 29 shows the changes of target width. This angle becomes very large at short ranges because, as may be seen from the definition of target width in Fig. 3, the target subtends a large bearing angle when near the echo-ranging ship.

Obivously the operation of the switch S-403 and relay S-401 does not let the cams of Figs. 25 and 28 execute exactly the motions required for the problem. That is, the relay operation introduces a vertical line in the curve which can only approximate the not-quite-vertical portions of the curve. However, the operation thus obtained is far superior to that obtainable from the cams alone if the cams for these two functions are constructed on a scale comparable to that required for the other functions. It is true that the sound operator will in general lose contact just before the position of the attack is reached, and that as long as the student can receive no echoes at this time it is immaterial what the cams do. However, the range at which contact is lost is substantially proportioned to the depth of the target-submarine, and the present invention permits cams of a reasonable size to accurately present the correct motions down to the extremely short ranges that are observed with shallow targets.

The present invention is capable of numerous modifications and variations and should be limited only within the scope of the appended claim.

We claim:

In combination in a training apparatus for simulating a depth-charge attack made against a submarine by sound contact, means for simulating the transmission of echo-ranging pings, means for simulating echoes from the submarine, means for shortening the interval between the ping and the echo as the range shortens, means for generating an indication of target bearing in simulation of said attack, said means including a selsyn generator and a cam follower for rotating it, and including also switch means for reversing the polarity of the power input to the control transformer for introducing a fixed shift in bearing near the time at which the simulated attacking ship crosses the presumed track of the target-submarine, and means for silencing echoes at this same time.

References Cited in the file of this patent

UNITED STATES PATENTS

| | | |
|---|---|---|
| 2,009,459 | Turner | July 30, 1935 |
| 2,126,910 | Moseley | Aug. 16, 1938 |
| 2,167,492 | Sproule | July 25, 1939 |
| 2,254,159 | Sperti | Aug. 26, 1941 |
| 2,373,313 | Jeandron | Apr. 10, 1945 |
| 2,399,661 | Bowie | May 7, 1946 |
| 2,416,307 | Grieg | Feb. 25, 1947 |
| 2,416,727 | Adorjan | Mar. 4, 1947 |
| 2,421,016 | Deloraine et al. | May 27, 1947 |
| 2,427,523 | Dolberg | Sept. 16, 1947 |
| 2,442,695 | Koch | June 1, 1948 |
| 2,482,020 | Meagher et al. | Sept. 13, 1949 |
| 2,713,729 | Springer | July 26, 1955 |
| 2,717,998 | Havens | Sept. 13, 1955 |
| 2,751,689 | Jones et al. | June 26, 1956 |